US009216687B2

(12) United States Patent
Huang et al.

(10) Patent No.: US 9,216,687 B2
(45) Date of Patent: Dec. 22, 2015

(54) APPARATUS, METHOD AND ARTICLE FOR VEHICLE TURN SIGNALS

(71) Applicant: Gogoro, Inc., Guishan Township (TW)

(72) Inventors: Jui Sheng Huang, Taoyuan (TW); Hok-Sum Horace Luke, Mercer Island, WA (US); Ching Chen, Taipei (TW)

(73) Assignee: Gogoro Inc., Hong Kong (CN)

( * ) Notice: Subject to any disclaimer, the term of this patent is extended or adjusted under 35 U.S.C. 154(b) by 50 days.

(21) Appl. No.: 14/079,894

(22) Filed: Nov. 14, 2013

(65) Prior Publication Data

US 2014/0142786 A1    May 22, 2014

Related U.S. Application Data

(60) Provisional application No. 61/727,403, filed on Nov. 16, 2012.

(51) Int. Cl.
| | |
|---|---|
| *B60L 9/00* | (2006.01) |
| *B60Q 1/40* | (2006.01) |
| *B60Q 1/34* | (2006.01) |
| *G08G 1/0965* | (2006.01) |

(52) U.S. Cl.
CPC ... *B60Q 1/40* (2013.01); *B60L 9/00* (2013.01); *B60Q 1/34* (2013.01); *G08G 1/0965* (2013.01)

(58) Field of Classification Search
CPC ........ G08G 1/0965; B60R 1/207; B60Q 1/34; B60Q 1/26; B60Q 1/40; B60D 1/36; B60K 2350/1024
USPC .......... 701/22, 117, 301, 32.4, 468; 340/903, 340/436, 473, 476, 905, 988, 906
See application file for complete search history.

(56) References Cited

U.S. PATENT DOCUMENTS

| | | | |
|---|---|---|---|
| 1,387,848 A | 8/1921 | Good | |
| 3,470,974 A | 10/1969 | Pefine | |
| 3,664,450 A | 5/1972 | Udden et al. | |
| 3,678,455 A | 7/1972 | Levey | |

(Continued)

FOREIGN PATENT DOCUMENTS

| | | |
|---|---|---|
| CA | 2 865 976 A1 | 9/2013 |
| CN | 1211844 A | 3/1999 |

(Continued)

OTHER PUBLICATIONS

Chen et al., "Apparatus, System, and Method for Authentication of Vehicular Components," U.S. Appl. No. 13/918,703, filed Jun. 14, 2013, 84 pages.

(Continued)

*Primary Examiner* — Gertrude Arthur Jeanglaude
(74) *Attorney, Agent, or Firm* — Seed IP Law Group PLLC

(57) ABSTRACT

A vehicle turn signal system causes a turn signal to turn off when a turn is completed or nearly completed based on the orientation of the vehicle changing to turn to a certain degree in a direction indicated by the turn signal. Current heading, position, location and/or or other such information is electronically received from a compass or other device by a turn signal switch controller. When the vehicle has changed direction from the direction the vehicle was traveling at the time associated with when the turn signal was turned on, a signal is sent to turn off the turn signal and reset the manual turn signal button or lever.

25 Claims, 7 Drawing Sheets

(56) References Cited

U.S. PATENT DOCUMENTS

| | | | |
|---|---|---|---|
| 3,687,484 | A | 8/1972 | Cosby |
| 3,708,028 | A | 1/1973 | Hafer |
| 4,087,895 | A | 5/1978 | Etienne |
| 4,129,759 | A | 12/1978 | Hug |
| 4,216,839 | A | 8/1980 | Gould et al. |
| 4,641,124 | A | 2/1987 | Davis |
| 4,669,570 | A | 6/1987 | Perret |
| 5,187,423 | A | 2/1993 | Marton |
| 5,189,325 | A | 2/1993 | Jarczynski |
| 5,236,069 | A | 8/1993 | Peng |
| 5,339,250 | A | 8/1994 | Durbin |
| 5,349,535 | A | 9/1994 | Gupta |
| 5,376,869 | A | 12/1994 | Konrad |
| 5,491,486 | A | 2/1996 | Welles, II et al. |
| 5,544,784 | A | 8/1996 | Malaspina |
| 5,596,261 | A | 1/1997 | Suyama |
| 5,627,752 | A | 5/1997 | Buck et al. |
| 5,631,536 | A | 5/1997 | Tseng |
| 5,642,270 | A | 6/1997 | Green et al. |
| 5,815,824 | A | 9/1998 | Saga et al. |
| 5,839,800 | A | 11/1998 | Koga et al. |
| 5,898,282 | A | 4/1999 | Drozdz et al. |
| 5,929,608 | A | 7/1999 | Ibaraki et al. |
| 5,998,963 | A | 12/1999 | Aarseth |
| 6,016,882 | A | 1/2000 | Ishikawa |
| 6,154,006 | A | 11/2000 | Hatanaka et al. |
| 6,177,867 | B1 | 1/2001 | Simon et al. |
| 6,177,879 | B1 | 1/2001 | Kokubu et al. |
| 6,236,333 | B1 | 5/2001 | King |
| 6,403,251 | B1 | 6/2002 | Baggaley et al. |
| 6,429,622 | B1 | 8/2002 | Svensson |
| 6,494,279 | B1 | 12/2002 | Hutchens |
| 6,498,457 | B1 | 12/2002 | Tsuboi |
| 6,515,580 | B1 | 2/2003 | Isoda et al. |
| 6,583,592 | B2 | 6/2003 | Omata et al. |
| 6,593,713 | B2 | 7/2003 | Morimoto et al. |
| 6,614,204 | B2 | 9/2003 | Pellegrino et al. |
| 6,621,244 | B1 | 9/2003 | Kiyomiya et al. |
| 6,796,396 | B2 | 9/2004 | Kamen et al. |
| 6,822,560 | B2 | 11/2004 | Geber et al. |
| 6,854,773 | B2 | 2/2005 | Lin |
| 6,899,268 | B2 | 5/2005 | Hara |
| 6,917,306 | B2 * | 7/2005 | Lilja ............................ 340/903 |
| 6,952,795 | B2 | 10/2005 | O'Gorman et al. |
| 7,010,682 | B2 | 3/2006 | Reinold et al. |
| 7,111,179 | B1 | 9/2006 | Girson et al. |
| 7,131,005 | B2 | 10/2006 | Levenson et al. |
| 7,392,068 | B2 | 6/2008 | Dayan et al. |
| 7,415,332 | B2 | 8/2008 | Ito et al. |
| 7,426,910 | B2 | 9/2008 | Elwart |
| 7,495,543 | B2 | 2/2009 | Denison et al. |
| 7,567,166 | B2 | 7/2009 | Bourgine De Meder |
| 7,592,728 | B2 | 9/2009 | Jones et al. |
| 7,596,709 | B2 | 9/2009 | Cooper et al. |
| 7,617,893 | B2 | 11/2009 | Syed et al. |
| 7,630,181 | B2 | 12/2009 | Wilk et al. |
| 7,698,044 | B2 | 4/2010 | Prakash et al. |
| 7,728,548 | B2 | 6/2010 | Daynes et al. |
| 7,761,307 | B2 | 7/2010 | Ochi et al. |
| 7,778,746 | B2 | 8/2010 | McLeod et al. |
| 7,863,858 | B2 | 1/2011 | Gangstoe et al. |
| 7,868,591 | B2 | 1/2011 | Phillips et al. |
| 7,898,439 | B2 | 3/2011 | Bettez et al. |
| 7,908,020 | B2 | 3/2011 | Pieronek |
| 7,923,144 | B2 | 4/2011 | Kohn et al. |
| 7,948,207 | B2 | 5/2011 | Scheucher |
| 7,979,147 | B1 | 7/2011 | Dunn |
| 7,993,155 | B2 | 8/2011 | Heichal et al. |
| 8,006,793 | B2 | 8/2011 | Heichal et al. |
| 8,006,973 | B2 | 8/2011 | Toba et al. |
| 8,013,571 | B2 | 9/2011 | Agassi et al. |
| 8,035,341 | B2 | 10/2011 | Genzel et al. |
| 8,035,349 | B2 | 10/2011 | Lubawy |
| 8,063,762 | B2 | 11/2011 | Sid |
| 8,068,952 | B2 | 11/2011 | Valentine et al. |
| 8,098,050 | B2 | 1/2012 | Takahashi |
| 8,106,631 | B2 | 1/2012 | Abe |
| 8,118,132 | B2 | 2/2012 | Gray, Jr. |
| 8,164,300 | B2 | 4/2012 | Agassi et al. |
| 8,219,839 | B2 | 7/2012 | Akimoto |
| 8,229,625 | B2 | 7/2012 | Lal et al. |
| 8,265,816 | B1 | 9/2012 | LaFrance |
| 8,301,365 | B2 | 10/2012 | Niwa et al. |
| 8,319,605 | B2 | 11/2012 | Hassan et al. |
| 8,326,259 | B2 | 12/2012 | Gautama et al. |
| 8,354,768 | B2 | 1/2013 | Cipriani |
| 8,355,965 | B2 | 1/2013 | Yamada |
| 8,378,627 | B2 | 2/2013 | Asada et al. |
| 8,412,401 | B2 | 4/2013 | Bertosa et al. |
| 8,437,908 | B2 | 5/2013 | Goff et al. |
| 8,447,598 | B2 | 5/2013 | Chutorash et al. |
| 8,564,241 | B2 | 10/2013 | Masuda |
| 8,614,565 | B2 | 12/2013 | Lubawy |
| 8,725,135 | B2 | 5/2014 | Weyl et al. |
| 2001/0018903 | A1 | 9/2001 | Hirose et al. |
| 2001/0052433 | A1 | 12/2001 | Harris et al. |
| 2002/0023789 | A1 | 2/2002 | Morisawa et al. |
| 2002/0070851 | A1 | 6/2002 | Raichle et al. |
| 2003/0052796 | A1 * | 3/2003 | Schmidt et al. ............... 340/905 |
| 2003/0141840 | A1 | 7/2003 | Sanders |
| 2003/0163434 | A1 | 8/2003 | Barends |
| 2003/0209375 | A1 | 11/2003 | Suzuki et al. |
| 2004/0236615 | A1 | 11/2004 | Msndy |
| 2004/0246119 | A1 | 12/2004 | Martin et al. |
| 2006/0047380 | A1 | 3/2006 | Welch |
| 2006/0208850 | A1 | 9/2006 | Ikeuchi et al. |
| 2006/0284601 | A1 | 12/2006 | Salasoo et al. |
| 2007/0026996 | A1 | 2/2007 | Ayabe et al. |
| 2007/0035397 | A1 | 2/2007 | Patenaude et al. |
| 2007/0069687 | A1 | 3/2007 | Suzuki |
| 2007/0090921 | A1 | 4/2007 | Fisher |
| 2007/0126395 | A1 | 6/2007 | Suchar |
| 2007/0145945 | A1 | 6/2007 | McGinley et al. |
| 2007/0159297 | A1 | 7/2007 | Paulk et al. |
| 2007/0208468 | A1 | 9/2007 | Sankaran et al. |
| 2007/0238164 | A1 | 10/2007 | Kim |
| 2008/0143292 | A1 | 6/2008 | Ward |
| 2008/0154801 | A1 | 6/2008 | Fein et al. |
| 2008/0276110 | A1 | 11/2008 | Indiani et al. |
| 2009/0024872 | A1 | 1/2009 | Beverly |
| 2009/0033456 | A1 | 2/2009 | Castillo et al. |
| 2009/0045773 | A1 | 2/2009 | Pandya et al. |
| 2009/0082957 | A1 | 3/2009 | Agassi et al. |
| 2009/0112394 | A1 | 4/2009 | Lepejian et al. |
| 2009/0158790 | A1 | 6/2009 | Oliver |
| 2009/0198372 | A1 | 8/2009 | Hammerslag |
| 2009/0251300 | A1 | 10/2009 | Yasuda et al. |
| 2009/0261779 | A1 | 10/2009 | Zyren |
| 2009/0294188 | A1 | 12/2009 | Cole |
| 2010/0013433 | A1 | 1/2010 | Baxter et al. |
| 2010/0026238 | A1 | 2/2010 | Suzuki et al. |
| 2010/0051363 | A1 | 3/2010 | Inoue et al. |
| 2010/0052588 | A1 | 3/2010 | Okamura et al. |
| 2010/0089547 | A1 | 4/2010 | King et al. |
| 2010/0094496 | A1 | 4/2010 | Hershkovitz et al. |
| 2010/0114798 | A1 | 5/2010 | Sirton |
| 2010/0114800 | A1 | 5/2010 | Yasuda et al. |
| 2010/0134067 | A1 | 6/2010 | Baxter et al. |
| 2010/0145717 | A1 | 6/2010 | Hoeltzel |
| 2010/0161481 | A1 | 6/2010 | Littrell |
| 2010/0188043 | A1 | 7/2010 | Kelty et al. |
| 2010/0191585 | A1 | 7/2010 | Smith |
| 2010/0198535 | A1 | 8/2010 | Brown et al. |
| 2010/0198754 | A1 | 8/2010 | Jones et al. |
| 2010/0201482 | A1 | 8/2010 | Robertson et al. |
| 2010/0225266 | A1 | 9/2010 | Hartman |
| 2010/0235043 | A1 | 9/2010 | Seta et al. |
| 2010/0250043 | A1 | 9/2010 | Scheucher |
| 2010/0308989 | A1 | 12/2010 | Gasper |
| 2010/0324800 | A1 | 12/2010 | Hanft et al. |
| 2011/0025267 | A1 | 2/2011 | Kamen et al. |
| 2011/0029157 | A1 | 2/2011 | Muzaffer |
| 2011/0032110 | A1 | 2/2011 | Taguchi |
| 2011/0060481 | A1 | 3/2011 | Kang et al. |

(56) References Cited

U.S. PATENT DOCUMENTS

| | | |
|---|---|---|
| 2011/0071932 A1 | 3/2011 | Agassi et al. |
| 2011/0082598 A1 | 4/2011 | Boretto et al. |
| 2011/0082621 A1 | 4/2011 | Berkobin et al. |
| 2011/0106329 A1 | 5/2011 | Donnelly et al. |
| 2011/0112710 A1 | 5/2011 | Meyer-Ebeling et al. |
| 2011/0114798 A1 | 5/2011 | Gemmati |
| 2011/0120789 A1 | 5/2011 | Teraya |
| 2011/0148346 A1 | 6/2011 | Gagosz et al. |
| 2011/0153141 A1 | 6/2011 | Beechie et al. |
| 2011/0160992 A1 | 6/2011 | Crombez |
| 2011/0169447 A1 | 7/2011 | Brown et al. |
| 2011/0191265 A1 | 8/2011 | Lowenthal et al. |
| 2011/0200193 A1 | 8/2011 | Blitz et al. |
| 2011/0202476 A1 | 8/2011 | Nagy et al. |
| 2011/0218703 A1 | 9/2011 | Uchida |
| 2011/0224868 A1 | 9/2011 | Collings, III et al. |
| 2011/0224900 A1 | 9/2011 | Hiruta et al. |
| 2011/0241824 A1 | 10/2011 | Uesugi |
| 2011/0248668 A1 | 10/2011 | Davis et al. |
| 2011/0260691 A1 | 10/2011 | Ishibashi et al. |
| 2011/0270480 A1 | 11/2011 | Ishibashi et al. |
| 2011/0279257 A1 | 11/2011 | Au et al. |
| 2011/0282527 A1 | 11/2011 | Inbarajan et al. |
| 2011/0292667 A1 | 12/2011 | Meyers |
| 2011/0295454 A1 | 12/2011 | Meyers |
| 2011/0303509 A1 | 12/2011 | Agassi et al. |
| 2012/0000720 A1 | 1/2012 | Honda et al. |
| 2012/0013182 A1 | 1/2012 | Minegishi et al. |
| 2012/0019196 A1 | 1/2012 | Fung |
| 2012/0038473 A1 | 2/2012 | Fecher |
| 2012/0062361 A1 | 3/2012 | Kosugi |
| 2012/0068817 A1 | 3/2012 | Fisher |
| 2012/0078413 A1 | 3/2012 | Baker, Jr. |
| 2012/0105078 A1 | 5/2012 | Kikuchi et al. |
| 2012/0109519 A1 | 5/2012 | Uyeki |
| 2012/0123661 A1 | 5/2012 | Gray, Jr. |
| 2012/0126969 A1 | 5/2012 | Wilbur et al. |
| 2012/0143410 A1 | 6/2012 | Gallagher et al. |
| 2012/0157083 A1 | 6/2012 | Otterson |
| 2012/0158229 A1 | 6/2012 | Schaefer |
| 2012/0167071 A1 | 6/2012 | Paek |
| 2012/0173292 A1 | 7/2012 | Solomon et al. |
| 2012/0194346 A1 | 8/2012 | Tsai et al. |
| 2012/0223575 A1 | 9/2012 | Hachiya et al. |
| 2012/0233077 A1 | 9/2012 | Tate, Jr. et al. |
| 2012/0248868 A1 | 10/2012 | Mobin et al. |
| 2012/0248869 A1 | 10/2012 | Itagaki et al. |
| 2012/0253567 A1 | 10/2012 | Levy et al. |
| 2012/0256588 A1 | 10/2012 | Hayashi et al. |
| 2012/0259665 A1 | 10/2012 | Pandhi et al. |
| 2012/0271723 A1 | 10/2012 | Penilla et al. |
| 2012/0280573 A1 | 11/2012 | Ohkura et al. |
| 2012/0296512 A1 | 11/2012 | Lee et al. |
| 2012/0299527 A1 | 11/2012 | Vo |
| 2012/0299537 A1 | 11/2012 | Kikuchi |
| 2012/0299721 A1 | 11/2012 | Jones |
| 2012/0316671 A1 | 12/2012 | Hammerslag et al. |
| 2012/0319649 A1 | 12/2012 | Billmaier |
| 2013/0024306 A1 | 1/2013 | Shah et al. |
| 2013/0026971 A1 | 1/2013 | Luke et al. |
| 2013/0026972 A1 | 1/2013 | Luke et al. |
| 2013/0026973 A1 | 1/2013 | Luke et al. |
| 2013/0027183 A1 | 1/2013 | Wu et al. |
| 2013/0030580 A1 | 1/2013 | Luke et al. |
| 2013/0030581 A1 | 1/2013 | Luke et al. |
| 2013/0030608 A1 | 1/2013 | Taylor et al. |
| 2013/0030630 A1 | 1/2013 | Luke et al. |
| 2013/0030696 A1 | 1/2013 | Wu et al. |
| 2013/0030920 A1 | 1/2013 | Wu et al. |
| 2013/0031318 A1 | 1/2013 | Chen et al. |
| 2013/0033203 A1 | 2/2013 | Luke et al. |
| 2013/0046457 A1 | 2/2013 | Pettersson |
| 2013/0074411 A1 | 3/2013 | Ferguson et al. |
| 2013/0090795 A1 | 4/2013 | Luke et al. |
| 2013/0093271 A1 | 4/2013 | Luke et al. |
| 2013/0093368 A1 | 4/2013 | Luke et al. |
| 2013/0093384 A1 | 4/2013 | Nyu et al. |
| 2013/0116892 A1 | 5/2013 | Wu et al. |
| 2013/0119898 A1 | 5/2013 | Ohkura |
| 2013/0127416 A1 | 5/2013 | Karner et al. |
| 2013/0132307 A1 | 5/2013 | Phelps et al. |
| 2013/0151049 A1 | 6/2013 | Higashitani et al. |
| 2013/0151293 A1 | 6/2013 | Karner et al. |
| 2013/0166119 A1 | 6/2013 | Kummer et al. |
| 2013/0179061 A1 | 7/2013 | Gadh et al. |
| 2013/0181582 A1 | 7/2013 | Luke et al. |
| 2013/0200845 A1 | 8/2013 | Bito |
| 2013/0221928 A1 | 8/2013 | Kelty et al. |
| 2013/0254097 A1 | 9/2013 | Marathe et al. |
| 2013/0282254 A1 | 10/2013 | Dwan et al. |
| 2013/0345935 A1 | 12/2013 | Chang |
| 2014/0163813 A1 | 6/2014 | Chen et al. |
| 2014/0320046 A1 | 10/2014 | Luke et al. |
| 2014/0368032 A1 | 12/2014 | Doerndorfer |
| 2015/0042157 A1 | 2/2015 | Chen et al. |
| 2015/0046012 A1 | 2/2015 | Chen et al. |
| 2015/0153967 A1 | 6/2015 | Chen et al. |

FOREIGN PATENT DOCUMENTS

| | | |
|---|---|---|
| CN | 101071953 A | 11/2007 |
| CN | 101950998 B | 1/2011 |
| CN | 102064565 A | 5/2011 |
| DE | 44 32 539 A1 | 6/1995 |
| DE | 10 2007 045633 A1 | 4/2009 |
| DE | 10 2010 039075 A1 | 2/2011 |
| EP | 0 693 813 A1 | 1/1996 |
| EP | 1 177 955 A2 | 2/2002 |
| EP | 1 667 306 A1 | 6/2006 |
| EP | 1 798 100 A2 | 6/2007 |
| EP | 2 101 390 A2 | 9/2009 |
| EP | 2 182 575 A1 | 5/2010 |
| EP | 2 230 146 A2 | 9/2010 |
| EP | 2 428 939 A1 | 3/2012 |
| JP | 5-38003 A | 2/1993 |
| JP | 5-135804 A | 6/1993 |
| JP | 07-031008 A | 1/1995 |
| JP | 7-36504 U | 7/1995 |
| JP | 8-178683 A | 7/1996 |
| JP | 9-119839 A | 5/1997 |
| JP | 10-117406 A | 5/1998 |
| JP | 10-170293 A | 6/1998 |
| JP | 10-307952 A | 11/1998 |
| JP | 11-049079 | 2/1999 |
| JP | 11-51681 A | 2/1999 |
| JP | 11-176487 A | 7/1999 |
| JP | 11-205914 A | 7/1999 |
| JP | 2000-102102 A | 4/2000 |
| JP | 2000-102103 A | 4/2000 |
| JP | 2000-341868 A | 12/2000 |
| JP | 2001-57711 A | 2/2001 |
| JP | 2001-128301 | 5/2001 |
| JP | 2002-140398 A | 5/2002 |
| JP | 2003-102110 A | 4/2003 |
| JP | 2003-118397 | 4/2003 |
| JP | 2003-262525 A | 9/2003 |
| JP | 2004-215468 A | 7/2004 |
| JP | 2005-67453 A | 3/2005 |
| JP | 2006-121874 A | 5/2006 |
| JP | 2007-35479 A | 2/2007 |
| JP | 2007-60353 A | 3/2007 |
| JP | 2007-118642 A | 5/2007 |
| JP | 2007-148590 A | 6/2007 |
| JP | 2007-325458 A | 12/2007 |
| JP | 2008-127894 A | 6/2008 |
| JP | 2008-219953 A | 9/2008 |
| JP | 2008-285075 A | 11/2008 |
| JP | 2009-8609 A | 1/2009 |
| JP | 2009-512035 A | 3/2009 |
| JP | 2009-103504 A | 5/2009 |
| JP | 2009-171646 A | 7/2009 |
| JP | 2009-171647 A | 7/2009 |
| JP | 4319289 B2 | 8/2009 |
| JP | 2009-303364 A | 12/2009 |

(56) References Cited

FOREIGN PATENT DOCUMENTS

| | | |
|---|---|---|
| JP | 2010-022148 A | 1/2010 |
| JP | 2010-108833 A | 5/2010 |
| JP | 2010-148246 A | 7/2010 |
| JP | 2010-179764 A | 8/2010 |
| JP | 2010-186238 A | 8/2010 |
| JP | 2010-191636 A | 9/2010 |
| JP | 2010-200405 A | 9/2010 |
| JP | 2010-212048 A | 9/2010 |
| JP | 2010-26986 A | 12/2010 |
| JP | 2010-540907 A | 12/2010 |
| JP | 2011-83166 A | 4/2011 |
| JP | 2011-126452 | 6/2011 |
| JP | 2011-131631 A | 7/2011 |
| JP | 2011-131805 A | 7/2011 |
| JP | 2011-142704 A | 7/2011 |
| JP | 2011-142779 A | 7/2011 |
| JP | 2011-233470 A | 11/2011 |
| JP | 2012-151916 A | 8/2012 |
| JP | 2012-526409 A | 10/2012 |
| KR | 1998-045020 U | 9/1998 |
| KR | 20040005146 A | 1/2004 |
| KR | 20100012401 A | 2/2010 |
| KR | 10-0971278 B1 | 7/2010 |
| KR | 20110004292 A | 1/2011 |
| KR | 20110041783 A | 4/2011 |
| KR | 20120020554 A | 3/2012 |
| TW | 200836452 A | 9/2008 |
| TW | I315116 B | 9/2009 |
| TW | M371880 U1 | 1/2010 |
| TW | M379269 U1 | 4/2010 |
| TW | M379789 U1 | 5/2010 |
| TW | M385047 U1 | 7/2010 |
| TW | 201043986 A1 | 12/2010 |
| TW | 201044266 A1 | 12/2010 |
| WO | 98/21132 A1 | 5/1998 |
| WO | 99/03186 A1 | 1/1999 |
| WO | 2009/039454 A1 | 3/2009 |
| WO | 2010/005052 A2 | 1/2010 |
| WO | 2010/033517 A2 | 3/2010 |
| WO | 2010/033881 A1 | 3/2010 |
| WO | 2010/035605 A1 | 4/2010 |
| WO | 2010/143483 A1 | 12/2010 |
| WO | 2011/138205 A1 | 11/2011 |
| WO | 2012/085992 A1 | 6/2012 |
| WO | 2012/160407 A1 | 11/2012 |
| WO | 2012/160557 A2 | 11/2012 |
| WO | 2013/024483 A2 | 2/2013 |
| WO | 2013/024484 A1 | 2/2013 |
| WO | 2013/042216 A1 | 3/2013 |
| WO | 2013/074819 A1 | 5/2013 |
| WO | 2013/080211 A1 | 6/2013 |
| WO | 2013/102894 A1 | 7/2013 |
| WO | 2013/108246 A2 | 7/2013 |
| WO | 2013/118113 A2 | 8/2013 |
| WO | 2013/128007 A2 | 9/2013 |
| WO | 2013/128009 A2 | 9/2013 |
| WO | 2013/128009 A3 | 9/2013 |
| WO | 2013/142154 A1 | 9/2013 |
| WO | 2013/144951 A1 | 10/2013 |

OTHER PUBLICATIONS

Chen et al., "Apparatus, System, and Method for Authentication of Vehicular Components ," U.S. Appl. No. 61/783,041, filed Mar. 14, 2013, 84 pages.

Chen et al., "Apparatus, System, and Method for Authentication of Vehicular Components," Office Action mailed Nov. 22, 2013, for U.S. Appl. No. 13/918,703, 35 pages.

Chen et al., "Apparatus, Method and Article for Providing Vehicle Diagnostic Data," U.S. Appl. No. 14/022,134, filed Sep. 9, 2013, 61 pages.

Chen et al., "Apparatus, Method and Article for Providing Vehicle Diagnostic Data," U.S. Appl. No. 61/601,404, filed Feb. 21, 2012, 56 pages.

Huang et al., "Apparatus, Method and Article for Vehicle Turn Signals," U.S. Appl. No. 61/727,403, filed Nov. 16, 2012, 41 pages.

International Search Report and Written Opinion for corresponding International Patent Application No. PCT/US2012/048380, mailed Feb. 27, 2013, 9 pages.

International Search Report and Written Opinion for corresponding International Patent Application No. PCT/US2012/048382, mailed Feb. 27, 2013, 9 pages.

International Search Report and Written Opinion for corresponding European Patent Application No. PCT/US2012/063979, mailed Mar. 4, 2013, 10 pages.

International Search Report and Written Opinion for corresponding International Patent Application No. PCT/US2012/048391, mailed Dec. 21, 2012, 9 pages.

International Search Report and Written Opinion for corresponding European Patent Application No. PCT/US2012/048349, mailed Feb. 18, 2013, 9 pages.

International Search Report and Written Opinion for corresponding European Patent Application No. PCT/US2012/048354, mailed Feb. 18, 2013, 11 pages.

International Search Report and Written Opinion for corresponding European Patent Application No. PCT/US2012/048358, mailed Feb. 25, 2013, 9 pages.

International Search Report and Written Opinion for corresponding European Patent Application No. PCT/US2012/048366, mailed Jan. 21, 2013, 10 pages.

International Search Report and Written Opinion for corresponding European Patent Application No. PCT/US2012/048367, mailed Jan. 17, 2013, 8 pages.

International Search Report and Written Opinion for corresponding European Patent Application No. PCT/US2012/048375, mailed Jan. 23, 2013, 9 pages.

International Search Report and Written Opinion for corresponding European Patent Application No. PCT/US2012/048379, mailed Dec. 17, 2012, 9 pages.

Luke et al., "Apparatus, Method and Article for Authentication, Security and Control of Portable Charging Devices and Power Storage Devices, Such as Batteries," U.S. Appl. No. 14/017,090, filed Sep. 3, 2013, 69 pages.

Luke et al., "Apparatus, Method and Article for Authentication, Security and Control of Portable Charging Devices and Power Storage Devices, Such as Batteries," U.S. Appl. No. 61/773,621, filed Mar. 6, 2013, 69 pages.

Luke et al., "Apparatus, Method and Article for Providing Targeted Advertising in a Rechargeable Electrical Power Storage Device Distribution Environment," U.S. Appl. No. 61/773,614, filed Mar. 6, 2013, 77 pages.

Luke et al., "Detectible Indication of an Electric Motor Vehicle Standby Mode," Office Action for U.S. Appl. No. 13/646,320, mailed May 30, 2013, 13 pages.

Luke et al., "Detectible Indication of an Electric Motor Vehicle Standby Mode," U.S. Appl. No. 61/543,720, filed Oct. 5, 2011, 35 pages.

Luke et al., "Detectible Indication of an Electric Motor Vehicle Standby Mode," U.S. Appl. No. 61/684,432, filed Aug. 17, 2012, 41 pages.

Luke et al., "Drive Assembly for Electric Powered Device," U.S. Appl. No. 61/546,411, filed Oct. 12, 2011, 18 pages.

Luke et al., "Modular System for Collection and Distribution of Electric Storage Devices," U.S. Appl. No. 61/789,065, filed Mar. 15, 2013, 76 pages.

Luke et al., "Apparatus, Method and Article for Authentication, Security and Control of Power Storage Devices, Such as Batteries, Based on User Profiles," U.S. Appl. No. 61/534,772, filed Sep. 14, 2011, 55 pages.

Luke et al., "Apparatus, Method and Article for Authentication, Security and Control of Power Storage Devices, Such as Batteries," U.S. Appl. No. 14/023,344, filed Sep. 10, 2013, 59 pages.

Luke et al., "Apparatus, Method and Article for Collection, Charging and Distributing Power Storage Devices, Such as Batteries," U.S. Appl. No. 61/511,900, filed Jul. 26, 2011, 73 pages.

(56) References Cited

OTHER PUBLICATIONS

Luke et al., "Apparatus, Method and Article for Authentication, Security and Control of Power Storage Devices, Such as Batteries," U.S. Appl. No. 61/534,761, filed Sep. 14, 2011, 55 pages.
Luke et al., "Apparatus, Method and Article for Collection, Charging and Distributing Power Storage Devices, Such as Batteries," U.S. Appl. No. 61/647,936, filed May 16, 2012, 76 pages.
Luke et al., "Apparatus, Method and Article for Redistributing Power Storage Devices, Such as Batteries, Between Collection, Charging and Distribution Machines," U.S. Appl. No. 61/534,753, filed Sep. 14, 2011, 65 pages.
Luke et al., "Dynamically Limiting Vehicle Operation for Best Effort Economy," Office Action for U.S. Appl. No. 13/559,264, mailed Aug. 14, 2013, 21 pages.
Luke et al., "Dynamically Limiting Vehicle Operation for Best Effort Economy," U.S. Appl. No. 61/511,880, filed Jul. 26, 2011, 52 pages.
Luke et al., "Thermal Management of Components in Electric Motor Drive Vehicles," U.S. Appl. No. 61/647,941, filed May 16, 2012, 47 pages.
Luke et al., "Thermal Management of Components in Electric Motor Drive Vehicles," U.S. Appl. No. 61/511,887, filed Jul. 26, 2011, 44 pages.
Luke, "Apparatus, Method and Article for Changing Portable Electrical Power Storage Device Exchange Plans," U.S. Appl. No. 61/778,038, filed Mar. 12, 2013, 56 pages.
Luke, "Apparatus, Method and Article for Providing Information Regarding a Vehicle Via a Mobile Device," U.S. Appl. No. 14/017,081, filed Sep. 3, 2013, 81 pages.
Luke, "Apparatus, Method and Article for Providing Information Regarding a Vehicle Via a Mobile Device," U.S. Appl. No. 61/780,781, filed Mar. 13, 2013, 80 pages.
Taylor et al., "Apparatus, Method and Article for Physical Security of Power Storage Devices in Vehicles," Notice of Allowance for U.S. Appl. No. 13/559,054, mailed May 30, 2013, 32 pages.
Taylor et al., "Apparatus, Method and Article for Physical Security of Power Storage Devices in Vehicles," Office Action for U.S. Appl. No. 13/559,054, mailed Dec. 3, 2012, 11 pages.
Taylor et al., "Apparatus, Method and Article for Physical Security of Power Storage Devices in Vehicles," U.S. Appl. No. 14/012,845, filed Aug. 28, 2013, 64 pages.
Taylor et al., "Apparatus, Method and Article for Physical Security of Power Storage Devices in Vehicles," U.S. Appl. No. 61/557,170, filed Nov. 8, 2011, 60 pages.
Wu et al., "Battery Configuration for an Electric Vehicle," U.S. Appl. No. 61/716,388, filed Oct. 19, 2012, 37 pages.
Wu et al., "Apparatus, Method and Article for a Power Storage Device Compartment," U.S. Appl. No. 61/581,566, filed Dec. 29, 2011, 61 pages.
Wu et al., "Apparatus, Method and Article for Providing Information Regarding Availability of Power Storage Devices at a Power Storage Device Collection, Charging and Distribution Machine," U.S. Appl. No. 14/022,140, filed Sep. 9, 2013, 56 pages.
Wu et al., "Apparatus, Method and Article for Providing Information Regarding Availability of Power Storage Devices at a Power Storage Device Collection, Charging and Distribution Machine," U.S. Appl. No. 61/601,953, filed Feb. 22, 2012, 53 pages.
Wu et al., "Apparatus, Method and Article for Providing Locations of Power Storage Device Collection, Charging and Distribution Machines," Office Action for U.S. Appl. No. 13/559,333, mailed Jul. 3, 2013, 14 pages.
Wu et al., "Apparatus, Method and Article for Providing Locations of Power Storage Device Collection, Charging and Distribution Machines," U.S. Appl. No. 14/022,147, filed Sep. 9, 2013, 56 pages.
Wu et al., "Apparatus, Method and Article for Providing Locations of Power Storage Device Collection, Charging and Distribution Machines," Office Action mailed Nov. 27, 2013, for U.S. Appl. No. 13/559,333, 19 pages.
Wu et al., "Apparatus, Method and Article for Providing Locations of Power Storage Device Collection, Charging and Distribution Machines," Office Action mailed Nov. 19, 2013, for U.S. Appl. No. 14/022,147, 10 pages.
Wu et al., "Apparatus, Method and Article for Providing Locations of Power Storage Device Collection, Charging and Distribution Machines," U.S. Appl. No. 61/601,949, filed Feb. 22, 2012, 56 pages.
Wu et al., "Apparatus, Method and Article for Security of Vehicles," U.S. Appl. No. 61/557,176, filed Nov. 8, 2011, 37 pages.
Wu, "Battery Configuration for an Electric Vehicle," U.S. Appl. No. 14/057,405, filed Oct. 18, 2013, 38 pages.
Chen et al., "Apparatus, Method and Article for Providing Vehicle Diagnostic Data," Office Action mailed Dec. 30, 2013, for U.S. Appl. No. 14/022,134, 20 pages.
International Preliminary Report on Patentability and Written Opinion for corresponding International Patent Application No. PCT/US2012/048349, issued on Jan. 28, 2014, 5 pages.
International Preliminary Report on Patentability and Written Opinion for corresponding International Patent Application No. PCT/US2012/048354, issued on Jan. 28, 2014, 7 pages.
International Preliminary Report on Patentability and Written Opinion for corresponding International Patent Application No. PCT/US2012/048358, issued on Jan. 28, 2014, 5 pages.
International Preliminary Report on Patentability and Written Opinion for corresponding International Patent Application No. PCT/US2012/048366, issued on Jan. 28, 2014, 5 pages.
International Preliminary Report on Patentability and Written Opinion for corresponding International Patent Application No. PCT/US2012/048367, issued on Jan. 28, 2014, 4 pages.
International Preliminary Report on Patentability and Written Opinion for corresponding International Patent Application No. PCT/US2012/048375, issued on Jan. 28, 2014, 5 pages.
International Preliminary Report on Patentability and Written Opinion for corresponding International Patent Application No. PCT/US2012/048379, issued on Jan. 28, 2014, 5 pages.
International Preliminary Report on Patentability and Written Opinion for corresponding International Patent Application No. PCT/US2012/048380, issued on Jan. 28, 2014, 5 pages.
International Preliminary Report on Patentability and Written Opinion for corresponding International Patent Application No. PCT/US2012/048382, issued on Jan. 28, 2014, 5 pages.
International Preliminary Report on Patentability and Written Opinion for corresponding International Patent Application No. PCT/US2012/048391, issued on Jan. 28, 2014, 6 pages.
International Search Report and Written Opinion for corresponding International Patent Application No. PCT/US2012/048347, mailed Dec. 18, 2012, 8 pages.
International Search Report and Written Opinion for corresponding International Patent Application No. PCT/US2013/070131, mailed Feb. 19, 2014, 17 pages.
Luke et al., "Apparatus, Method and Article for Authentication, Security and Control of Portable Charging Devices and Power Storage Devices, Such as Batteries," Office Action mailed Jan. 6, 2014, for U.S. Appl. No. 14/017,090, 19 pages.
Luke et al., "Dynamically Limiting Vehicle Operation for Best Effort Economy," Office Action for U.S. Appl. No. 13/559,264, mailed Feb. 12, 2014, 24 pages.
Luke, "Apparatus, Method and Article for Providing Information Regarding a Vehicle Via a Mobile Device," Office Action for U.S. Appl. No. 14/017,081, mailed Jan. 30, 2014, 36 pages.
Wu et al., "Apparatus, Method and Article for a Power Storage Device Compartment," Office Action for U.S. Appl. No. 13/559,125, mailed Feb. 24, 2014, 28 pages.
"Inrunner," retreived from URL=http://en.wikipedia.org/w/index.php?title=Inrunner&printable=yes on Sep. 28, 2011, 1 page.
"Outrunner," retreived from URL=http://en.wikipedia.org/w/index.php?title=Outrunner&printable=yes on Sep. 16, 2011, 2 pages.
Chen et al., "Adjusting Electric Vehicle Systems Based on an Electrical Energy Storage Device Thermal Profile," U.S. Appl. No. 61/862,854, filed Aug. 6, 2013, 74 pages.
Chen et al., "Apparatus, System, and Method for Authentication of Vehicular Components," Notice of Allowance mailed Mar. 25, 2014, for U.S. Appl. No. 13/918,703, 7 pages.

(56) References Cited

OTHER PUBLICATIONS

Chen et al., "Apparatus, Method and Article for Providing Vehicle Diagnostic Data," Office Action mailed Apr. 9, 2014, for U.S. Appl. No. 14/022,134, 20 pages.
Communication pursuant to Rules 161(2) and 162 EPC, for corresponding European Patent Application No. 12817273.1, dated Mar. 25, 2014, 3 pages.
Communication pursuant to Rules 161(2) and 162 EPC, for corresponding European Patent Application No. 12817141.0, dated Mar. 26, 2014, 3 pages.
Communication pursuant to Rules 161(2) and 162 EPC, for corresponding European Patent Application No. 12818308.4, dated Mar. 26, 2014, 3 pages.
Communication pursuant to Rules 161(2) and 162 EPC, for corresponding European Patent Application No. 12817696.3, dated Mar. 27, 2014, 3 pages.
Communication pursuant to Rules 161(2) and 162 EPC, for corresponding European Patent Application No. 12817883.7, dated Mar. 27, 2014, 3 pages.
Communication pursuant to Rules 161(2) and 162 EPC, for corresponding European Patent Application No. 12818447.0, dated Mar. 27, 2014, 3 pages.
International Search Report and Written Opinion for corresponding International Patent Application No. PCT/US2012/048344, mailed Feb. 28, 2013, 9 pages.
International Search Report and Written Opinion for corresponding International Application No. PCT/US2012/058930, mailed Mar. 15, 2013, 11 pages.
International Search Report and Written Opinion for corresponding International Application No. PCT/US2012/059931, mailed Mar. 29, 2013, 13 pages.
Luke et al., "Portable Electrical Energy Storage Device," U.S. Appl. No. 61/872,126, filed Aug. 30, 2013, 39 pages.
Luke et al., "Modular System for Collection and Distribution of Electric Storage Devices," U.S. Appl. No. 14/202,589, filed Mar. 10, 2014, 76 pages.
Luke et al., "Electric Device Drive Assembly and Cooling System," U.S. Appl. No. 61/615,144, filed Mar. 23, 2012, 43 pages.
Luke et al., "Apparatus, Method and Article for Authentication, Security and Control of Power Storage Devices, Such as Batteries," Office Action mailed Feb. 26, 2014, for U.S. Appl. No. 13/559,038, 13 pages.
Luke et al., "Apparatus, Method and Article for Authentication, Security and Control of Power Storage Devices, Such as Batteries," Office Action mailed Feb. 25, 2014, for U.S. Appl. No. 14/023,344, 12 pages.
Luke et al., "Thermal Management of Components in Electric Motor Drive Vehicles," Office Action mailed Apr. 2, 2014, for U.S. Appl. No. 13/559,259, 11 pages.
Luke, "Apparatus, Method and Article for Changing Portable Electrical Power Storage Device Exchange Plans," U.S. Appl. No. 14/204,587, filed Mar. 11, 2014, 56 pages.
Microchip, "AN885: Brushless DC (BLDC) Motor Fundamentals," Microchip Technology Inc., 2003, 19 pages.
Wu et al., "Apparatus, Method and Article for Providing Information Regarding Availability of Power Storage Devices at a Power Storage Device Collection, Charging and Distribution Machine," Office Action mailed Mar. 5, 2014, for U.S. Appl. No. 14/022,140, 8 pages.
Wu et al., "Apparatus, Method and Article for Providing Locations of Power Storage Device Collection, Charging and Distribution Machines," Office Action mailed Mar. 5, 2014, for U.S. Appl. No. 14/022,147, 12 pages.
Wu et al., "Apparatus, Method and Article for Power Storage Device Failure Safety," U.S. Appl. No. 14/071,134, filed Nov. 4, 2013, 68 pages.
Wu et al., "Apparatus, Method and Article for Power Storage Device Failure Safety," Office Action for U.S. Appl. No. 14/071,134, mailed Feb. 12, 2014, 14 pages.
Chen et al., "Apparatus, Method and Article for Providing Vehicle Diagnostic Data," Notice of Allowance mailed Jul. 9, 2014, for U.S. Appl. No. 14/022,134, 10 pages.
Chen et al., "Apparatus, Method and Article for Providing Vehicle Diagnostic Data," Office Action mailed Jun. 18, 2014, for U.S. Appl. No. 13/559,390, 16 pages.
Chen et al., "Systems and Methods for Powering Electric Vehicles Using a Single or Multiple Power Cells," U.S. Appl. No. 61/862,852, filed Aug. 6, 2013, 46 pages.
International Search Report and Written Opinion, for corresponding International Application No. PCT/US2014/021369, mailed Jul. 2, 2014, 14 pages.
International Search Report and Written Opinion for corresponding International Application No. PCT/US2014/024757, mailed Jul. 11, 2014, 15 pages.
International Search Report and Written Opinion, for corresponding International Application No. PCT/US2014/022610, mailed Jul. 10, 2014, 12 pages.
Luke et al., "Apparatus, Method and Article for Authentication, Security and Control of Portable Charging Devices and Power Storage Devices, Such as Batteries," Office Action mailed Jun. 26, 2014, for U.S. Appl. No. 14/017,090, 19 pages.
Luke et al., "Apparatus, Method and Article for Authentication, Security and Control of Power Storage Devices, Such as Batteries," Office Action mailed Aug. 19, 2014, for U.S. Appl. No. 13/559,038, 14 pages.
Luke et al., "Dynamically Limiting Vehicle Operation for Best Effort Economy," Office Action for U.S. Appl. No. 13/559,264, mailed Aug. 19, 2014, 26 pages.
Wu et al., "Apparatus, Method and Article for Providing to a User Device Information Regarding Availability of Portable Electrical Energy Storage Devices at a Portable Electrical Energy Storage Device Collection, Charging and Distribution Machine," Notice of Allowance mailed Jun. 30, 2014, for U.S. Appl. No. 14/022,140, 5 pages.
Wu et al., "Apparatus, Method and Article for Providing Locations of Power Storage Device Collection, Charging and Distribution Machines," Notice of Allowance mailed Jul. 10, 2014, for U.S. Appl. No. 13/559,333, 9 pages.
Wu et al., "Apparatus, Method and Article for Power Storage Device Failure Safety," Office Action mailed Jun. 9, 2014, for U.S. Appl. No. 14/071,134, 15 pages.
Chen et al., "Apparatus, Method and Article for Providing Vehicle Diagnostic Data," Office Action mailed Jun. 3, 2015, for U.S. Appl. No. 14/179,442, 20 pages.
Chen et al., "Apparatus, Method and Article for Providing Vehicle Diagnostic Data," Notice of Allowance mailed Nov. 3, 2014, for U.S. Appl. No. 13/559,390, 10 pages.
Chen et al., "Apparatus, Method and Article for Providing Vehicle Diagnostic Data," Notice of Allowance mailed Jun. 23, 2015, for U.S. Appl. No. 14/609,201, 12 pages.
English Translation of Japanese Office Action mailed Feb. 17, 2015, for corresponding Japanese Patent Application No. 2014-523007, 7 pages.
Extended European Search Report dated Apr. 24, 2015, for corresponding EP Application No. 12817097.4, 9 pages.
International Preliminary Report on Patentability and Written Opinion for corresponding International Patent Application No. PCT/US2013/070131, issued on May 19, 2015, 13 pages.
International Search Report and Written Opinion for corresponding International Application No. PCT/US2014/023539, mailed Sep. 4, 2014, 12 pages.
Japanese Office Action with English Translation dated Jun. 30, 2015, for corresponding JP Application No. 2014-523020, 15 pages.
Japanese Office Action with English Translation dated Mar. 31, 2015, for corresponding JP Application No. 2014-523014, 9 pages.
Japanese Office Action with English Translation, mailed Dec. 16, 2014, for corresponding JP Application No. 2014-523013, 11 pages.
Luke et al., "Apparatus, Method and Article for Authentication, Security and Control of Power Storage Devices, Such as Batteries," Office Action mailed Jun. 19, 2015, for U.S. Appl. No. 14/023,344, 9 pages.

(56) References Cited

OTHER PUBLICATIONS

Luke et al., "Apparatus, Method and Article for Authentication, Security and Control of Power Storage Devices, Such as Batteries, Based on User Profiles," Office Action mailed May 11, 2015, for U.S. Appl. No. 13/559,010, 26 pages.
Luke et al., "Apparatus, Method and Article for Authentication, Security and Control of Power Storage Devices, Such as Batteries," Office Action mailed Aug. 21, 2014, for U.S. Appl. No. 14/023,344, 13 pages.
Luke et al., "Apparatus, Method and Article for Redistributing Power Storage Devices, Such as Batteries, Between Collection, Charging and Distribution Machines," Office Action mailed Mar. 13, 2015, for U.S. Appl. No. 13/559,091, 33 pages.
Luke et al., "Dynamically Limiting Vehicle Operation for Best Effort Economy," Office Action for U.S. Appl. No. 13/559,264, mailed Jan. 21, 2015, 31 pages.
Luke et al., "Dynamically Limiting Vehicle Operation for Best Effort Economy," Office Action for U.S. Appl. No. 13/559,264, mailed Jun. 15, 2015, 36 pages.
Luke, "Apparatus, Method and Article for Providing Information Regarding a Vehicle Via a Mobile Device," Office Action for U.S. Appl. No. 14/017,081, mailed Jul. 21, 2014, 42 pages.
Luke, "Apparatus, Method and Article for Providing Information Regarding a Vehicle Via a Mobile Device," Office Action for U.S. Appl. No. 14/017,081, mailed Dec. 31, 2014, 59 pages.
Luke, "Apparatus, Method and Article for Providing Information Regarding a Vehicle Via a Mobile Device," Office Action mailed Jul. 15, 2015, for U.S. Appl. No. 14/017,081, 61 pages.
Park, "A Comprehensive Thermal Management System Model for Hybrid Electric Vehicles," dissertation, The University of Michigan, 2011, 142 pages.
Taylor et al., "Apparatus, Method and Article for Physical Security of Power Storage Devices in Vehicles," Office Action mailed Jun. 23, 2015, for U.S. Appl. No. 14/012,845, 11 pages.
Taylor et al., "Apparatus, Method and Article for Physical Security of Power Storage Devices in Vehicles," Office Action mailed Dec. 10, 2014, for U.S. Appl. No. 14/012,845, 13 pages.
Taylor et al., "Systems and Methods for Utilizing an Array of Power Storage Devices, Such as Batteries," U.S. Appl. No. 14/601,840, filed Jan. 21, 2015, 51 pages.
Wu et al., "Apparatus, Method and Article for a Power Storage Device Compartment," Office Action for U.S. Appl. No. 13/559,125, mailed Jun. 16, 2015, 30 pages.
Wu et al., "Apparatus, Method and Article for a Power Storage Device Compartment," Office Action for U.S. Appl. No. 13/559,125, mailed Sep. 9, 2014, 28 pages.
Wu et al., "Apparatus, Method and Article for Providing Locations of Power Storage Device Collection, Charging and Distribution Machines," Office Action mailed Aug. 6, 2014, for U.S. Appl. No. 14/022,147, 17 pages.
Wu et al., "Apparatus, Method and Article for Providing Locations of Power Storage Device Collection, Charging and Distribution Machines," Notice of Allowance mailed Nov. 25, 2014, for U.S. Appl. No. 14/022,147, 5 pages.
Wu et al., "Apparatus, Method and Article for Providing to a User Device Information Regarding Availability of Portable Electrical Energy Storage Devices at a Portable Electrical Storage Device Collection, Charging and Distribution Machine," U.S. Appl. No. 14/511,137, filed Oct. 9, 2014, 56 pages.
Wu et al., "Apparatus, Method and Article for Security of Vehicles," Office Action mailed Jun. 4, 2015, for U.S. Appl. No. 13/671,144, 20 pages.
Wu et al., "Apparatus, Method and Article for Security of Vehicles," Office Action mailed Oct. 2, 2014, for U.S. Appl. No. 13/671,144, 20 pages.
Chinese Office Action dated Jul. 17, 2015, for corresponding CN Application No. 201280047017.1, with English Translation, 15 pages.
Chinese Office Action with English Translation, mailed Jul. 30, 2015, for corresponding CN Application No. 201280046871.6, 25 pages.
Communication pursuant to Rules 70(2) and 70a(2) EPC, dated Aug. 21, 2015, for corresponding European Patent Application No. 12817696.3-1807, 1 page.
Communication Pursuant to Rules 70(2) and 70a(2) EPC, dated Aug. 20, 2015, for corresponding European Patent Application No. 12817141.0-1807, 1 page.
Communication pursuant to Rules 70(2) and 70a(2) EPC, dated Aug. 21, 2015, for corresponding European Patent Application No. 12818447.0-1807, 1 page.
Extended European Search Report dated Aug. 3, 2015, for corresponding EP Application No. 12817141.0-1807, 9 pages.
Extended European Search Report dated Aug. 5, 2015, for corresponding European Patent Application No. 12817392.9, 9 pages.
Extended European Search Report dated Aug. 5, 2015, for corresponding EP Application No. 12817696.3-1807, 13 pages.
Extended European Search Report, dated Aug. 5, 2015, for Corresponding European Application No. 12818447.0-1807, 17 pages.
International Preliminary Report on Patentability dated Sep. 8, 2015, for corresponding WO Application No. PCT/US2014/021369, 9 pages.
Japanese Office Action dated Jun. 30, 2015, for corresponding JP Application No. 2014-523020, with English Translation, 15 pages.
Japanese Office Action dated Sep. 1, 2015, for corresponding JP Application No. 2014-523005, with English Translation, 11 pages.
Japanese Office Action mailed Jul. 14, 2015, for corresponding Japanese Application No. 2014-523007, 3 pages.
Japanese Office Action dated Sep. 8, 2015, for corresponding JP Application No. 2014-523018, with English Translation, 12 pages.
Luke et al., "Apparatus, Method and Article for Authentication, Security and Control of Power Storage Devices, Such As Batteries," Notice of Allowance mailed Aug. 3, 2015, for USAN 13/559,038, 13 pages.
Supplementary European Search Report dated Jul. 10, 2015, for corresponding EP Application No. 12847969.8-1503, 5 pages.

\* cited by examiner

APPARATUS, METHOD AND ARTICLE FOR VEHICLE TURN SIGNALS

BACKGROUND

Technical Field

The present disclosure generally relates to vehicle systems, and particularly to vehicle turn signal systems.

BRIEF SUMMARY

A turn signal system for a vehicle may be summarized as including at least one controller; and at least one communications line coupled to the at least one controller, wherein the at least one controller is configured to: receive, via the at least one communications line, information indicative of a turn signal of the vehicle having been turned on and information regarding a direction associated with the turn signal; receive, via the at least one communications line, compass information indicative of which direction the vehicle was heading at a time associated with when the turn signal was turned on; receive, via the at least one communications line, compass information indicative of the vehicle having changed direction from the direction the vehicle was heading at the time associated with when the turn signal was turned on; make a determination of whether to send a signal to turn off the turn signal based on the received compass information indicative of the vehicle having changed direction from the direction the vehicle was heading at the time associated with when the turn signal was turned on; and send the signal to turn off the turn signal if a determination was made to send the signal to turn off the turn signal.

The received compass information indicative of the vehicle having changed direction may include information indicative of a current direction in which the vehicle is heading. The at least one controller may be configured to make the determination of whether to send the signal to turn off the turn signal by being at least configured to: determine whether the current direction in which the vehicle is heading is toward the direction associated with the turn signal; determine a difference between the current direction in which the vehicle is heading and the direction the vehicle was heading at the time associated with when the turn signal was turned on; determine whether the difference is greater than a threshold difference value; and if the difference is greater than the threshold difference value and the current direction in which the vehicle is heading is toward the direction associated with the turn signal, make a determination to send the signal to turn off the turn signal based at least on the difference being greater than the threshold difference value. The threshold difference value may be in the range of approximately 70 degrees to approximately 90 degrees. The threshold difference value may be approximately 80 degrees. The at least one controller may be further configured to make the determination of whether to send a signal to turn off the turn signal by being at least configured to: determine whether the current direction in which the vehicle is heading is in a direction substantially opposite the direction the vehicle was heading at the time associated with when the turn signal was turned on; and if the current direction in which the vehicle is heading is substantially opposite the direction the vehicle was heading at the time associated with when the turn signal was turned on, make a determination to not send the signal to turn off the turn signal based at least on the current direction in which the vehicle is heading being substantially opposite the direction the vehicle was heading at the time associated with when the turn signal was turned on.

The turn signal system for a vehicle may further include a compass coupled to the controller and the at least one controller may be configured to receive from the compass the compass information indicative of which direction the vehicle was heading and the compass information indicative of the vehicle having changed direction.

The controller may be part of a compass which is configured to generate the compass information indicative of which direction the vehicle was heading and the compass information indicative of the current direction in which the vehicle is heading.

The turn signal system for a vehicle may further include a turn signal switch coupled to the controller and the at least one controller may be configured to send to the turn signal switch the signal to turn off the turn signal.

The at least one controller may be configured to receive from the turn signal switch the information indicative of the turn signal having been turned on and the information regarding the direction associated with the turn signal. The turn signal switch may be one of the following: a mechanical switch, an electro-mechanical switch. The turn signal switch may be an electronic switch.

The turn signal system for a vehicle may further include a wireless communications module coupled to the communications, and the at least one controller may be configured to receive via the wireless communications module the compass information indicative of which direction the vehicle was heading and the compass information indicative of the vehicle having changed direction.

The at least one controller may be configured to receive from a satellite system via the wireless communications module the compass information indicative of which direction the vehicle was heading at the time associated with when the turn signal was turned on and the information indicative of the current direction in which the vehicle is heading. The at least one controller may be configured to receive the information indicative of the current direction in which the vehicle is heading by at least being configured to: in response to receiving the information indicative of the turn signal having been turned on and the information regarding the direction associated with the turn signal: send a signal to request the information indicative of the current direction in which the vehicle is heading; and receive the information indicative of the current direction in which the vehicle is heading in response to the signal sent to request. The at least one controller may further include a memory coupled to the at least one controller, and may be configured to receive the compass information indicative of which direction the vehicle was heading at the time associated with when the turn signal was turned on and receive the information indicative of the current direction in which the vehicle is heading by being at least configured to: over a period of time that includes a substantially current time, receive compass information indicative of which direction the vehicle is heading; store in the memory the received compass information indicative of which direction the vehicle is heading substantially as the compass information indicative of which direction the vehicle is heading is received; within the period of time, and in response to the receiving the information indicative of the turn signal having been turned on, retrieve from the stored compass information the information indicative of which direction the vehicle was heading at the time associated with when the turn signal was turned on; and after retrieval of the information indicative of which direction the vehicle was heading at the time associated with when the turn signal was turned on, retrieve from the stored compass information, information stored at the substantially current time as the information indicative of the current direction in which the vehicle is heading. The at least one controller may be further configured to initiate the storing in the memory of the received compass information in response to receipt of the information indicative of the turn signal having been turned on.

A method in an automated turn signal system for a vehicle may be summarized as including receiving, by the automated turn signal system, an electrical signal indicative of a turn signal of a vehicle being on; and sending, by the automated turn signal system, an electrical signal causing the turn signal to turn off automatically based on an orientation of the vehicle changing to turn in a direction indicated by the turn signal at a time associated with when the turn signal was turned on.

The sending the electrical signal causing the turn signal to turn off automatically may include causing a button or lever of a switch of the turn signal to return to a neutral position. The sending electrical signal causing the turn signal to turn off automatically in response to an orientation of the vehicle changing to turn in a direction indicated by the turn signal may include receiving, by the automated turn signal system, compass information indicative of the vehicle having changed direction from a direction the vehicle was heading at a time associated with when the turn signal was turned on; and sending, by the automated turn signal system, the electrical signal causing the turn signal to turn off based at least on the received compass information indicative of the vehicle having changed direction from the direction the vehicle was heading at the time associated with when the turn signal was turned on. The sending the electrical signal causing the turn signal to turn off may be further based on a degree of the changed direction being over a threshold value. The sending the electrical signal causing the turn signal to turn off based on the received compass information may include determining, by the automated turn signal system, whether a current direction in which the vehicle is heading is toward the direction indicated by the turn signal at the time associated with when the turn signal was turned on; determining, by the automated turn signal system, a difference between the current direction in which the vehicle is heading and the direction the vehicle was heading at the time associated with when the turn signal was turned on; determining, by the automated turn signal system, whether the difference is greater than a threshold difference value; if the difference is greater than the threshold difference value and the current direction in which the vehicle is heading is toward the direction indicated by the turn signal, making a determination, by the automated turn signal system, to send the electrical signal causing the turn signal to turn off based at least on the difference being greater than the threshold difference value; and sending, by the automated turn signal system, the electrical signal causing the turn signal to turn off in response to the determination made to send the electrical signal.

A non-transitory computer-readable storage medium may be summarized as having computer executable instructions stored thereon that, when executed by at least one computer processor, cause the at least one computer processor to perform: determining whether a current direction in which a vehicle is heading is toward a direction that was associated with a turn signal when it was turned on; determining a difference between the current direction in which the vehicle is heading and a direction the vehicle was heading at a time associated with when the turn signal was turned on; determining whether the difference is greater than a threshold difference value; if the difference is greater than the threshold difference value and the current direction in which the vehicle is heading is in the direction associated with the turn signal, making a determination to send a signal to turn off the turn signal based at least on the difference being greater than the threshold difference value; and sending the signal to turn off the turn signal in response to the determination made to send the signal.

The computer executable instructions stored thereon, when executed by the at least one computer processor, may further cause the at least one computer processor to perform: over a period of time that includes a substantially current time, receiving compass information indicative of which direction the vehicle is heading; storing the received compass information indicative of which direction the vehicle is heading, the storing occurring substantially as the compass information indicative of which direction the vehicle is heading is being received; within the period of time, and in response to receiving information indicative of the turn signal having been turned on, retrieving from the stored compass information, information indicative of the direction the vehicle was heading at the time associated with when the turn signal was turned on; and after retrieving the information indicative of which direction the vehicle was heading at the time associated with when the turn signal was turned on, retrieving from the stored compass information, direction information stored at the substantially current time as information indicative of the current direction in which the vehicle is heading.

Non-transitory computer-readable storage medium may be a memory device located within a vehicle. The computer executable instructions stored thereon, when executed by the at least one computer processor, may further cause the at least one computer processor to perform: if the vehicle has been heading in the current direction the vehicle is heading over a particular length of time, then making the determination to send the signal to turn off the turn signal additionally based at least on that the vehicle has been heading in the current direction the vehicle is heading over the particular length of time.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with turn signal systems, turn signal switches, wireless technologies, controllers, and communications systems and structures and networks have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment.

The use of ordinals such as first, second and third does not necessarily imply a ranked sense of order, but rather may only distinguish between multiple instances of an act or structure.

The headings and Abstract of the Disclosure provided herein are for convenience only and do not interpret the scope or meaning of the embodiments.

Figure 1:
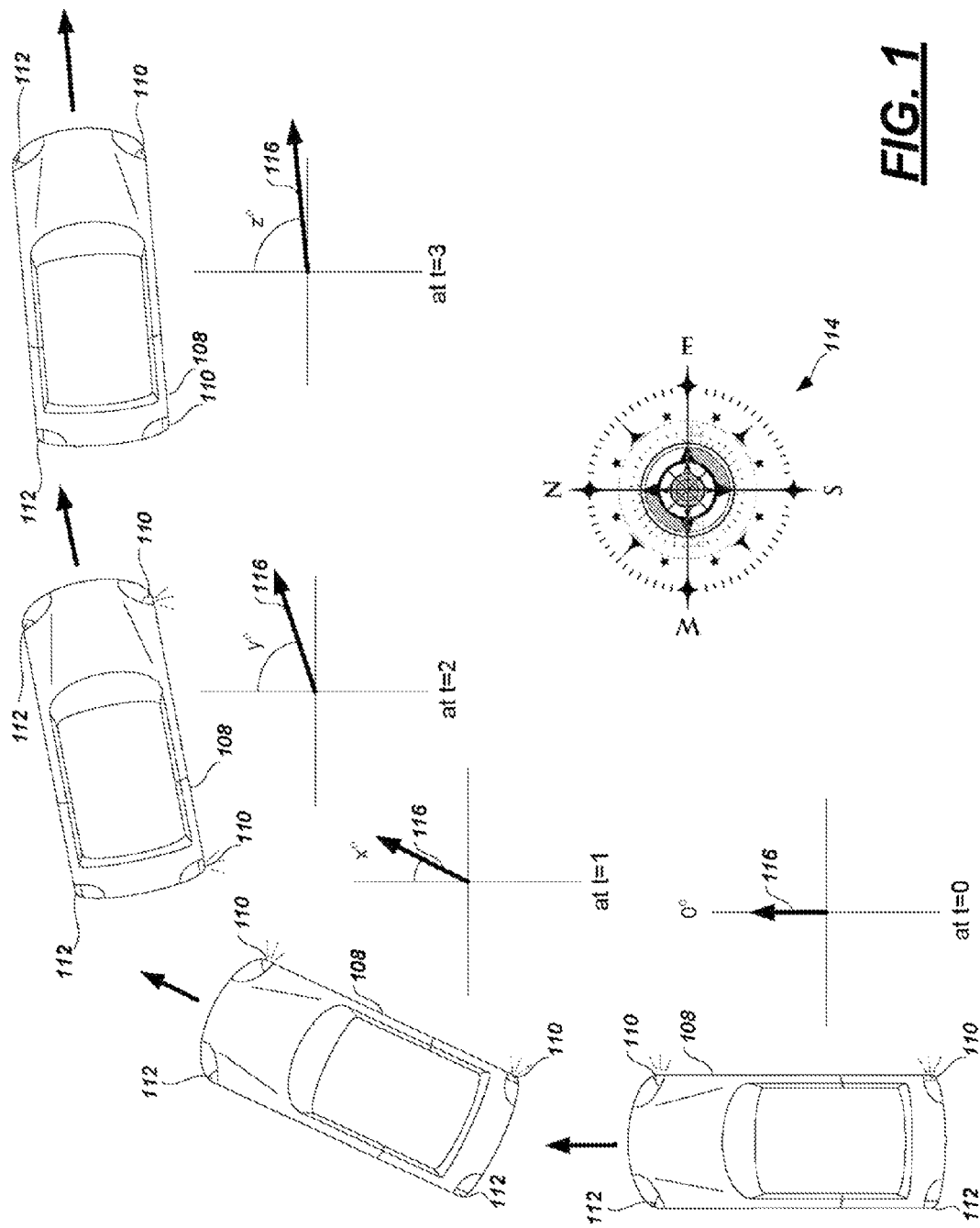
FIG. 1 is a top plan view of a vehicle making a right-hand turn showing the right-hand turn signal being automatically turned off once the right-hand-turn is made to a certain degree, according to one non-limiting illustrated embodiment.

FIG. 1 shows a top plan view of a vehicle making a right-hand turn and showing the right-hand turn signal being automatically turned off once the right-hand-turn is made to a certain degree, according to one non-limiting illustrated embodiment.

Although FIG. 1 shows an automobile, the vehicle 108 may be any powered vehicle or powered device with at least two wheels, including electric scooters or motorbikes, motorcycles cars, trucks, airplanes, trains, tractors, utility vehicles, maintenance vehicles, powered toys, etc. The vehicle 108 has a turn signal system (shown in FIG. 2) that senses a current orientation of the vehicle 108. For example, the turn signal system may receive information as output from a compass (e.g., a digital compass), heading indicator, or other information source that provides information regarding the current orientation of the vehicle and that is part of the turn signal system or in communication with the turn signal system. Such information regarding the orientation of the vehicle is generally referred to herein as "compass information." This compass information may include, but is not limited to, one or more of the following types of information: the current heading or course of the vehicle 108, i.e., the angle of the vehicle 108 relative to a fixed reference point or object (e.g., true north, magnetic north, compass north, the ground, etc.); true heading of the vehicle 108, which is in relation to the lines of meridian (north-south lines); the track of the vehicle 108 (or course over ground), which is the actual path followed by the vehicle 108 from one reference point to another reference point; a current cardinal direction in which the vehicle 108 is oriented, an orientation of the vehicle 108 relative to another reference point, a current orientation of the vehicle relative to the orientation of the vehicle at a point when one of the turn signals was last switched on, etc. Some or all of the values of compass information may be automatically reversed by the turn signal system when the vehicle 108 is in reverse.

Also, some or all of the compass information may be adjusted and/or corrected by the compass, heading indicator, or other information source that is part of the turn signal system or in communication with the turn signal system (shown in FIG. 2), based on compass error, magnetic variation, magnetic deviation such as the vehicle's own magnetic field, or other error. Typically, the heading or course information is measured in degrees from 0° clockwise to 360° in compass convention (0° being north and 90° being east) and, in some embodiments, may be communicated in this or a similar format to the turn signal system. The heading or course information may be expressed in three digits, using preliminary zeros if needed, e.g. 065°, however, the compass information may be expressed and communicated to the turn signal system in any useful format, or in a format which is able to be translated into a useful format by the turn signal system or other compass information source.

The example in FIG. 1 shows the orientation of the vehicle 108 changing over time while making a right-hand turn. This change in orientation happens to be in the direction that was indicated by the right-hand turn signal 110 when it turned on at an example point in time t=0. Also illustrated in the example of FIG. 1, is a compass rose 114 indicating which direction is north relative to the vehicle 108 as it is making the right-hand turn. Note that in the example shown in FIG. 1, north (i.e., 0°) also happens to be the heading of the vehicle 108 at time t=0 when the turn signal was turned on by the driver. However, in many instances this will not be the case. In the example embodiment, the current heading of the vehicle 108 is actually measured relative to the heading of the vehicle 108 when the turn signal was turned on by the driver at t=0 (which happens to be 0° in the example shown in FIG. 1) since this measurement is directly used to determine when to send a signal to automatically turn the turn signal off. However, in the example provided, the current heading of the vehicle 108 relative to north and relative to the heading of the vehicle 108 when the turn signal was turned on by the driver at t=0 are the same for ease of illustration and understanding.

Shortly after the right-hand turn signal 110 was turned on by the driver at t=0, at time t=1 the vehicle's heading was x° as the driver began to make the right-hand turn in the vehicle 108. As the driver continued the right-hand turn, the vehicle's heading continued to grow further away from the original heading of the vehicle 108 of 0° at t=0 (when the turn signal was turned on by the driver). In other words, the angle between the heading at t=0 of 0° when the turn signal was turned on and the current heading of the vehicle 108 grows larger as the vehicle 108 continues to turn right. For example, as shown by the vehicle heading arrow 116, at t=3 the heading was z°, which is further away from the original heading of 0° at t=0 than the vehicle 108 was at t=2 (y°) and yet still further than the vehicle 108 was at t=1 (x°).

Figure 2:
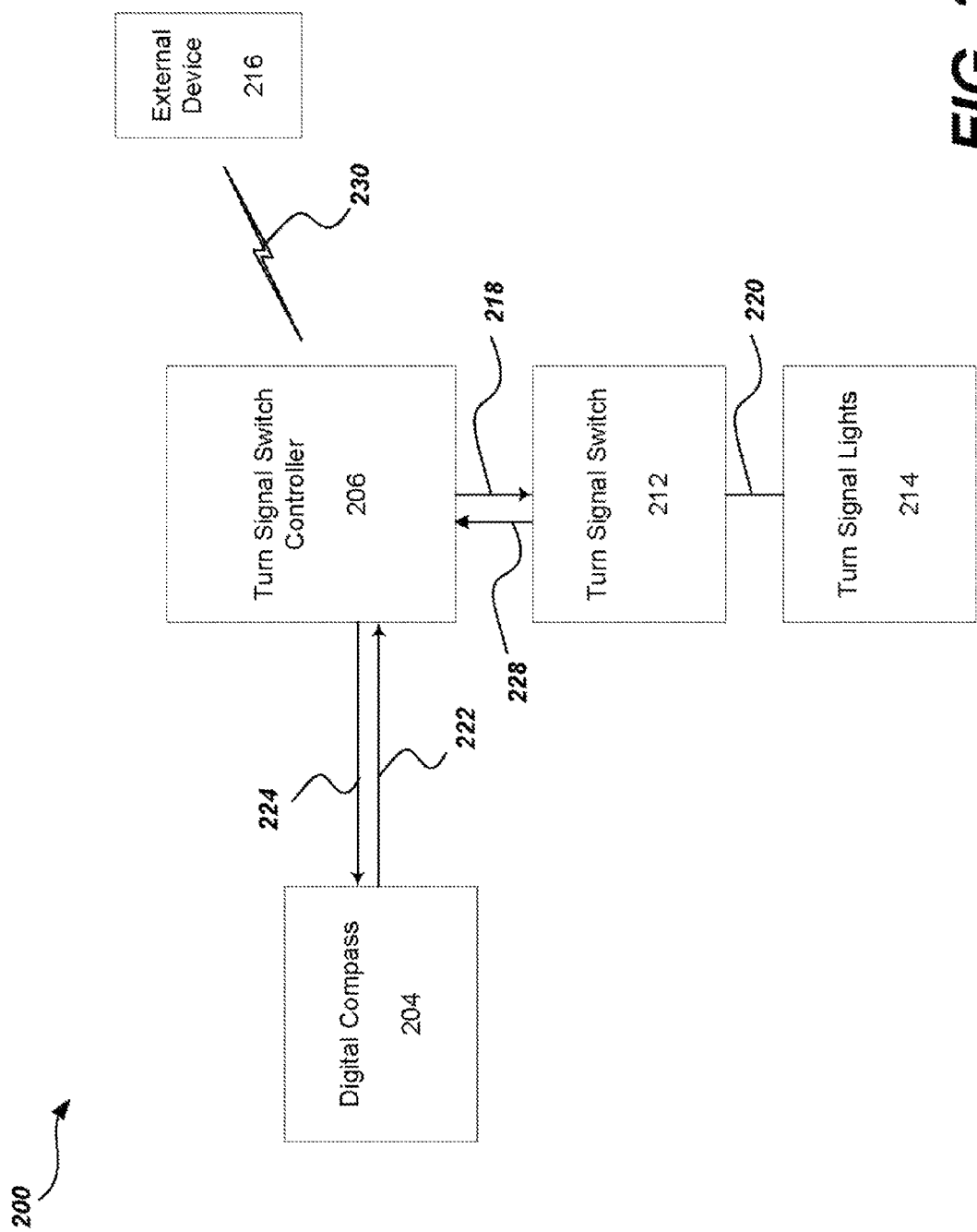
FIG. 2 is a block diagram of the turn signal system for the vehicle of FIG. 1, according to one non-limiting illustrated embodiment.

This type of heading information is received, monitored and/or stored by one or more components of the turn signal system of the vehicle 108 shown in FIG. 2 while the vehicle is being driven. In some embodiments, the receiving, monitoring and/or storing of this compass information may be triggered by various events, such as by the driver turning on or off the turn signal. For example, when the driver turns on the turn signal, the current orientation of the vehicle and which turn signal was turned on (left or right) may be stored or retrieved from storage immediately and an association made by the turn signal system between the current orientation of the vehicle and the turn signal being turned on at that time. When the vehicle 108 reaches a heading measurement threshold as measured relative to the heading of the vehicle 108 when the turn signal 110 was turned on (at t=0), the turn signal system will automatically send an electronic or electrical signal to activate a switch to turn off the right-hand turn signal 110 if it is still on, thus dispensing with the need for any traditional mechanical turn signal reset mechanism. Also, the turn signal system will use an electronic or electrical signal to automatically cause the button or lever of the driver's manual switch for the turn signal to return to a neutral position.

The heading measurement threshold in the example provided in FIG. 1 is z°, which occurred at t=3, at which point the turn signal system automatically sent an electrical or electronic signal to automatically turn off the right-hand turn signal 110 and reset the button or lever of the driver's manual switch for the turn signal in vehicle 108. In the example shown, z° is in effect a threshold difference between the current direction in which the vehicle 108 is heading and the direction the vehicle was heading at time t=0 that is associated with when the turn signal 110 was turned on. In the example embodiment, the threshold may be expressed as a different heading measurement based on whether the right turn signal 110 or the left turn signal 112 was turned on at t=0, such that the right turn signal does not turn off if the vehicle starts turning left and vice versa, but the basic operation is similar. For example, if the threshold heading z°=80° (for when the right turn signal was turned on at t=0) the corresponding threshold for if and when the left turn signal is turned on may be expressed as a corresponding threshold of 190°. Alternatively, for ease of use and implementation, the threshold settings may be input to the turn signal system as one value (e.g., 80°) which is intended to apply generally as just the threshold expressed as a measure of the difference in degrees between the current heading of the vehicle 108 and the heading of the vehicle when the turn signal was turned on. Any translation, reformatting or calculations that may be required to reformat the values to be expressed within the 0-360° heading format may be performed automatically by the turn signal system internally.

The turn signal system is configurable such that these left- and right-hand turn signal threshold values may be individually programmed, selected or otherwise set by the vehicle, owner, driver, vehicle manufacturer, turn signal system manufacturer, vehicle mechanic, and/or other party. For example, in some embodiments, the right-hand turn signal threshold may be in the range from 70° to 90°, because that is a range in which many vehicle turns are likely to be completed or nearly completed. However, any threshold value may be used. Also, when the vehicle 108 is in reverse, or when the system otherwise detects the vehicle 108 is heading in a direction opposite that of the vehicle 108 when the turn signal was turned on, the system may automatically turn off these features that automatically reset or turn off of the turn signals described herein, or alternatively, the corresponding threshold settings may be reversed automatically and then reversed again to their original values when the vehicle 108 is put in drive again.

FIG. 2 shows a block diagram of the turn signal system for the vehicle of FIG. 1, according to one non-limiting illustrated embodiment.

Shown is a digital compass 204, a turn signal switch controller 206, a turn signal switch 212, turn signal lights 214, and an external device 216. The turn signal switch controller 206 has an input 222 from the digital compass 204 and an input 228 from the turn signal switch 212. The turn signal switch controller 206 may also be in operable wireless communication over a wireless link 230 with the external device 216. The turn signal lights 214 are coupled to the turn signal switch 212 via line 220 between the turn signal switch 212 and the turn signal lights 214 such that they may be controlled by the turn signal switch accordingly.

One or more of the connections between the components in the vehicle turn signal system 200 may be logical or physical connections and communication between the components of the vehicle turn signal system 200 may be via any operable combination of analog, digital, wired or wireless signals.

The turn signal switch controller 206 is configured to control operation of the turn signal switch 212 via input 218 to turn the turn signal switch 212 on or off individually for the left and right turn signals of vehicle 108 (shown in FIG. 1). The turn signal switch 212 in turn controls the turn signal lights 214 via line 220 individually for the left and right turn signals of vehicle 108.

The digital compass 204 may be any device able to provide information regarding the orientation of the vehicle (i.e., compass information) electronically as described above, and in some embodiments, need not be digital. Examples include, but are not limited to, one or more of the following devices, or devices that include one or more of the following: a heading indicator, a magnetometer, microelectromechanical systems (MEMS) magnetic field sensor, a Lorentz-force-based MEMS sensor, a gyrocompass, a fiber optic gyrocompass, an accelerometer, a motion sensor, a global positioning system (GPS) device or receiver, etc. Also, the digital compass 204 may also or alternatively be the external device 216 or be part of the external device 216, such as a handheld device, tablet device, smartphone, etc., and provide the compass information wirelessly to the turn signal switch controller 206 over wireless link 230. The digital compass is physically positioned and/or calibrated such that the heading information that the digital compass 204 provides correlates to the direction in which the front of the vehicle 108 is pointed. Also, in some embodiments, if the vehicle is in reverse, the compass information may be automatically reversed by the digital compass 204 or the turn signal switch controller, one or more of which may additionally be connected to the controller of the drive system for the vehicle 108 in order to receive such information regarding whether the vehicle 108 is in reverse.

The digital compass may either periodically, aperiodically, constantly, continuously (or nearly constantly or continuously) provide the compass information to the turn signal switch controller 206 via input to the turn signal system 200. In some embodiments, the turn signal system 200 will buffer such information in an internal memory (Shown in FIG. 3) of the turn signal system 200 for quick access. Alternatively, the digital compass may output such compass information upon request by the turn signal switch controller received via input 224 to the digital compass 204.

In the present example embodiment, when the driver turns on the turn signal lights 214 either for the left or right turn signal using a button or lever of the turn signal switch 212, one or more signals are output from the turn signal switch 212 via input 228 to the turn signal switch controller 206 indicating that a turn signal has been turned on and which turn signal has been turned on (e.g., the right turn signal). This triggers the turn signal switch controller 206 to retrieve information regarding the current orientation of the vehicle (i.e., "compass information"). The compass information is immediately retrieved from the buffer memory (shown in FIG. 2) of the turn signal system 206 or directly from the digital compass via input 222. An association is made and stored by the turn signal switch controller 206 between the current orientation of the vehicle 108 and the particular turn signal that was turned on at that time. When the vehicle 108 reaches a heading measurement threshold (e.g., 80°) as measured relative to the heading of the vehicle 108 when the turn signal was turned on, the turn signal switch controller 206 will automatically send an electronic or electrical signal via an input 218 to the turn signal switch 212 to activate the turn signal switch 212 to turn off the right-hand turn signal if it is still on, thus dispensing with the need for any traditional mechanical turn signal reset mechanism. Also, the turn signal system will send an electronic or electrical signal via input 218 to the turn signal switch 212 to automatically cause the turn signal switch 212 to reset (or return to a neutral position) the button or lever of the driver's manual switch for the turn signal.

In some embodiments, the turn signal switch controller 206 may be configured to account for when a driver turns on the turn signal after beginning or in the middle of making a turn by temporarily adjusting the heading measurement threshold. For example, when the driver turns on the turn signal lights 214, the turn signal switch controller 206 may immediately retrieve and examine the previously received and stored compass data (which may be stored in the buffer memory of the turn signal switch controller) to calculate the rate at which (and in which direction) the orientation of the vehicle 108 has been changing, if at all, over the past 1 or 2 seconds (or other selected period of time). If this calculated rate at which the orientation of the vehicle 108 has been changing in the direction indicated by the turn signal is over a determined threshold, then the heading measurement threshold at which the turn signal controller 206 will cause the turn signal to be switched off may be reduced to account for the likelihood that the turn is already partially completed. Also, the rate of orientation change threshold may be changed dynamically by the turn signal switch controller 206 proportionally to the calculated rate of orientation change to account for the speed of the turn, and thus, when the turn will be likely be completed.

Figure 3:
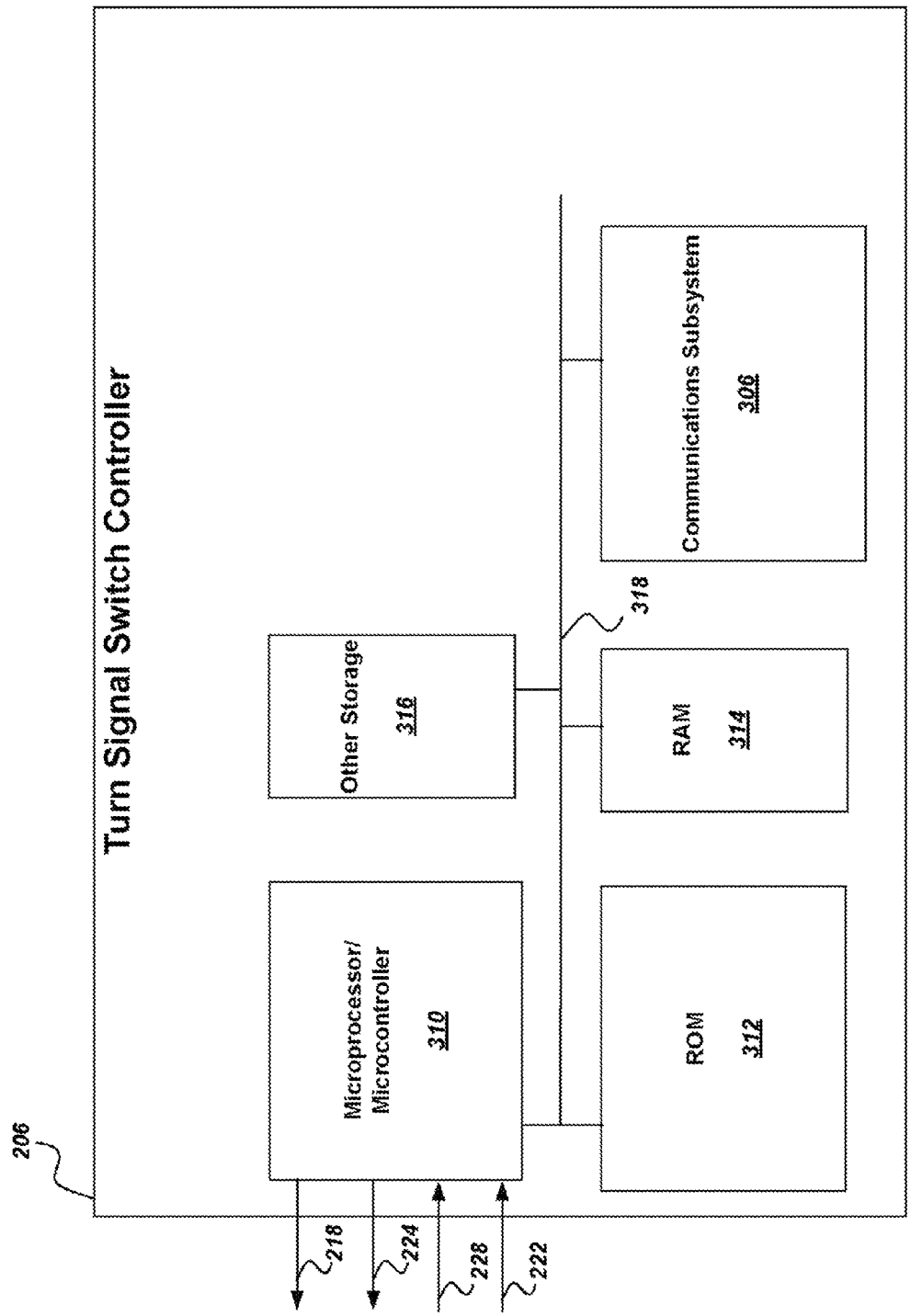
FIG. 3 is a schematic view of a turn signal switch controller of the turn signal system of FIG. 2, according to one non-limiting illustrated embodiment.

Also, in some embodiments, the turn signal switch controller 206 may be configured to account for situations like those when a driver quickly changes direction after turning on the turn signal (such as when dodging something in the road soon before the turn, while making the turn, or soon after making the turn) by causing the turn signal to turn off based on a minimum time the vehicle must travel in a current heading that is at, near or over the heading measurement threshold. For example, when the vehicle 108 reaches a heading measurement threshold (e.g., 80°) as measured relative to the heading of the vehicle 108 when the turn signal was turned on, the turn signal switch controller 206 will start a timer to measure the time the vehicle is traveling at the current heading. Once that timer reaches a particular time threshold for the current heading, the turn signal switch controller 206 will automatically send an electronic or electrical signal via an input 218 to the turn signal switch 212 to activate the turn signal switch 212 to turn off the turn signal if it is still on, thus dispensing with the need for any traditional mechanical turn signal reset mecha-nism. The timer may reset each time the heading of the vehicle changes over a particular number of degrees that is different from the current heading. Both the time threshold and the particular number of degrees that is different from the current heading may be pre-selected and/or configurable by a user, maintenance person, the driver, and/or the manufacturer of the vehicle, and may also be varied dynamically by the turn signal switch controller based on one or more various factors including, but not limited to, driving habits, geographic locations, vehicle attributes, user preferences, etc. This functionality may be used instead of or in conjunction with other functionality described in other embodiments herein, for example, in conjunction with the rate of orientation change threshold being changed dynamically by the turn signal switch controller 206 proportionally to the calculated rate of orientation change to account for the speed of the turn, and thus, when the turn will be likely be completed. FIG. 3 is a schematic view diagram of the turn signal switch controller 206 of the vehicle turn signal system 200 of FIG. 2, according to one non-limiting illustrated embodiment.

The controller 310, for example, is a microprocessor, microcontroller, programmable logic controller (PLC), programmable gate array (PGA), application-specific integrated circuit (ASIC) or another controller capable of receiving signals from various sensors, performing logical operations, and sending signals to various components. Typically, the controller 310 may take the form of a microprocessor (e.g., INTEL, AMD, ATOM). The turn signal switch controller 206 may also be coupled to one or more non-transitory processor- or computer-readable storage media, for example read-only memory (ROM) 312, random access memory (RAM) 314, and other storage 316 (e.g., solid-state storage media such as flash memory or EEPROM, or spinning storage media such as hard disk). The non-transitory processor- or computer-readable storage media 312, 314, 316 may be in addition to any non-transitory storage medium (e.g., registers) which is part of the controller 310. The turn signal switch controller 206 may include one or more buses 318 (only one illustrated) coupling various components together, for example one or more power buses, instruction buses, data buses, etc. As shown, the controller includes input 228 from the turn signal switch 212, input 222 from the digital compass 204, and has an output coupled to the input 218 of the turn signal switch 212 and an output coupled to the input 218 of the digital compass 204 (shown in FIG. 2).

As illustrated, the ROM 312, or some other one of the non-transitory processor- or computer-readable storage media 312, 314, 316, stores instructions and/or data or values for variables or parameters. The sets of data may take a variety of forms, for example a lookup table, a set of records in a database, etc. The instructions and sets of data or values are executable by the controller 310. Execution of the instructions and sets of data or values causes the controller 310 to perform specific acts to determine a current orientation of the vehicle based on the input received via input 222 from the digital compass 204 and also determine when a turn signal has been turned on and which turn signal has been turned on based on the input received via input 228 from the turn signal switch 212. Execution of the instructions and sets of data or values also causes the controller 310 to perform specific acts, store information, and/or perform calculations regarding compass information involving past and/or current orientations of the vehicle 108 to determine when to send a signal to turn off one of the turn signals. Overall, execution of the instructions and sets of data or values causes the controller 310 to perform specific acts to cause operation of the turn signal switch controller 206 as described herein and also below with reference to various flow diagrams (FIGS. 4-7).

The controller 310 may use RAM 314 in a conventional fashion, for volatile storage of instructions or data (e.g., compass data, etc.). For example, the turn signal controller may buffer in RAM 314 compass information indicating the current orientation of the vehicle 108 received from an external source for immediate access. The turn signal controller may also store in RAM 314 an indication received from the turn signal switch of which turn signal is on, how long it has been on or other data. The controller 310 may use data store 316 to log or retain information, for example, compass information or other information regarding position, orientation, movement and direction of the vehicle, turn signal switch information and/or turn signal switch specifications, digital compass information and/or digital compass specifications, codes, credentials, security certificates, passwords, other vehicle information, etc. The instructions are executable by the controller 310 to control operation of the turn signal switch controller 206 in response to input from embedded systems, external devices, or from remote systems such as those of the external device 216 described herein.

The controller 310 may also receive signals from various sensors and/or components (e.g., digital compass) of an external device 216 via the communications subsystem 306 of the turn signal switch controller 206. This information may include information compass information or other information related to orientation of the vehicle 108.

The communications subsystem 306 may include one or more communications modules or components which facilitate communications with the various components of the external device 216 of FIG. 2 (e.g., such as to receive compass information) and/or of other external devices. Also data may be exchanged between the turn signal switch controller 206, or a device to which the turn signal switch controller 206 is connected, and the external device 216 for authentication purposes. The communications subsystem 306 may provide wired and/or wireless communications. The communications subsystem 306 may include one or more ports, wireless receivers, wireless transmitters or wireless transceivers to provide wireless signal paths to the various remote components or systems. The communications subsystem 306 may, for example, include components enabling short range (e.g., via Bluetooth, near field communication (NFC), radio frequency identification (RFID) components and protocols) or longer range wireless communications (e.g., over a wireless LAN, satellite, satellite, or cellular network), such as for receiving GPS data, and may include one or more modems or one or more Ethernet or other types of communications cards or components for doing so. The remote communications subsystem 306 may include one or more bridges or routers suitable to handle network traffic including switched packet type communications protocols (TCP/IP), Ethernet or other networking protocols.

Figure 4:
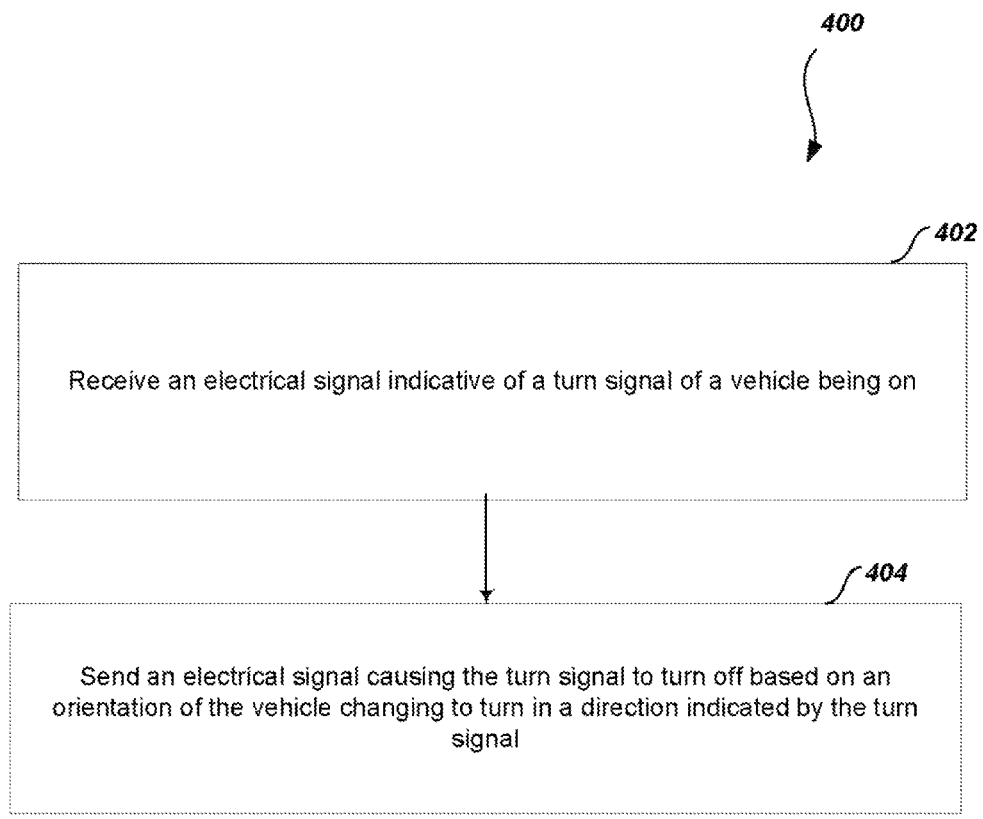
FIG. 4 is a flow diagram showing a high level method of operating the automated turn signal system of FIG. 2, according to one non-limiting illustrated embodiment.

FIG. 4 shows a high level method 400 of operating the automated turn signal system 200 of FIG. 2, according to one non-limiting illustrated embodiment.

At 402, the vehicle turn signal system 200 receives an electrical signal indicative of a turn signal of a vehicle being on.

At 404, the vehicle turn signal system 200 sends an electrical signal causing the turn signal to turn off automatically in response to an orientation of the vehicle changing to turn in a direction indicated by the turn signal when it was turned on.

Figure 5:
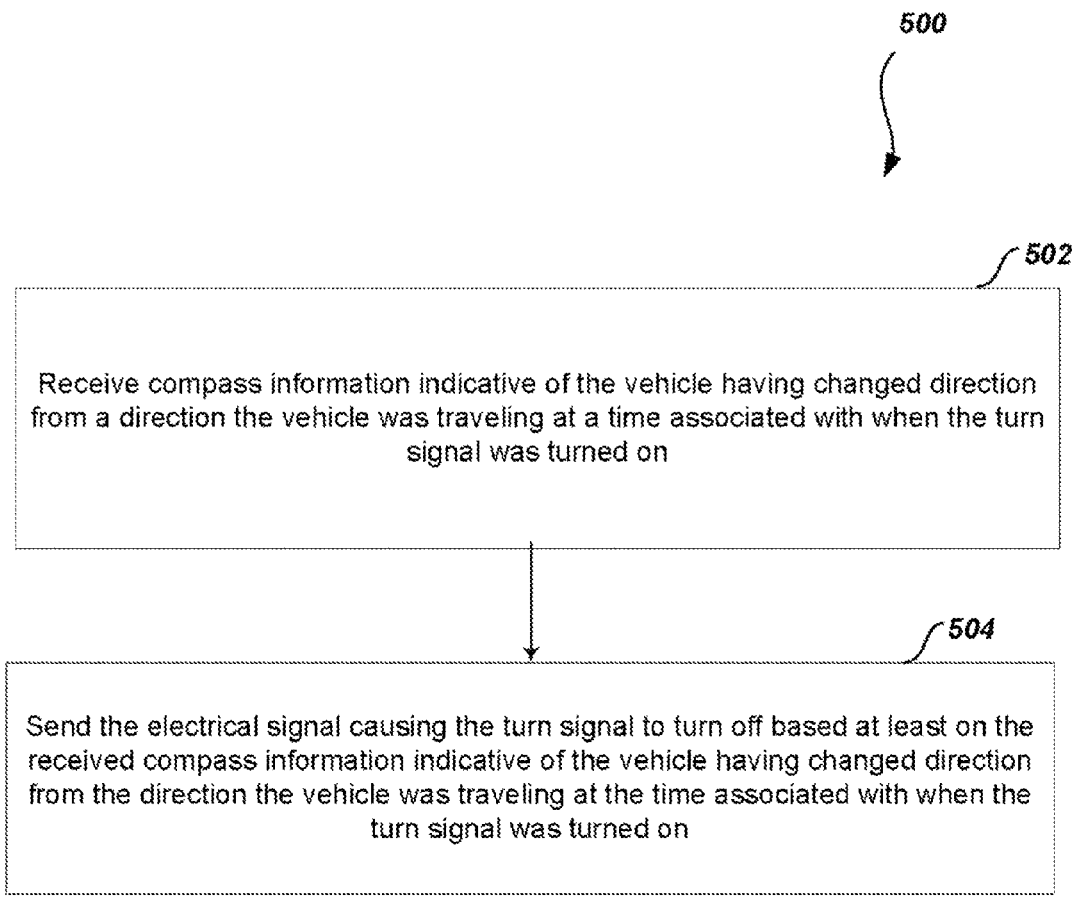
FIG. 5 is a flow diagram showing a low level method of operating the automated turn signal system of FIG. 2, according to one non-limiting illustrated embodiment, useful in the method of FIG. 4.

FIG. 5 shows a low level method 500 of operating the automated turn signal system 200 of FIG. 2, according to one non-limiting illustrated embodiment, useful in the method 400 of FIG. 4. For example, the method 500 describes in more detail what may occur in causing the electrical signal to turn off the turn signal to be sent.

At 502, the vehicle turn signal system 200 receives compass information indicative of the vehicle having changed direction from a direction the vehicle was traveling at a time associated with when the turn signal was turned on.

At 504, the vehicle turn signal system 200 sends the electrical signal causing the turn signal to turn off based at least on the received compass information indicative of the vehicle having changed direction from the direction the vehicle was traveling at the time associated with when the turn signal was turned on.

Figure 6:
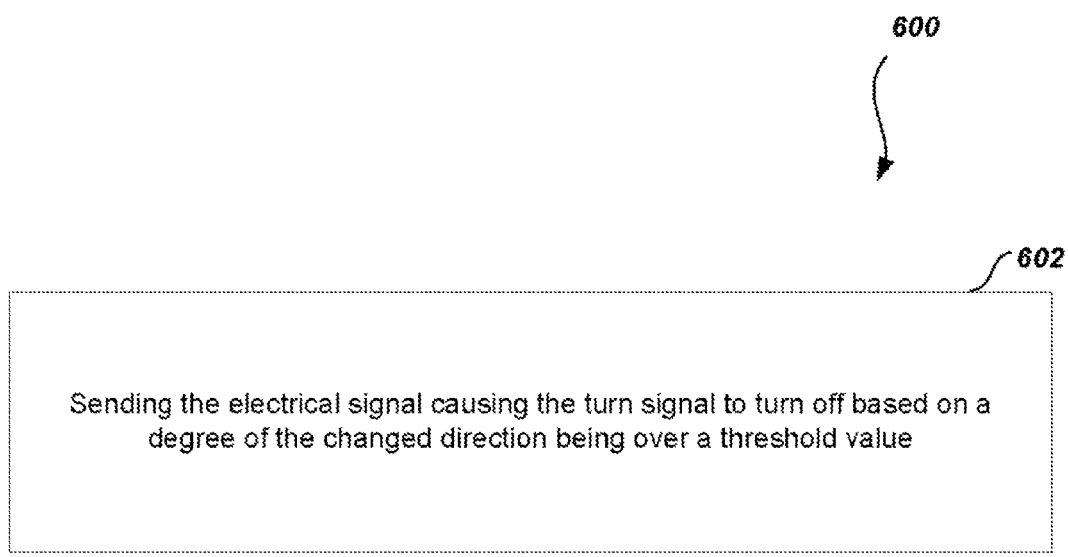
FIG. 6 is a flow diagram showing a low level method of operating the automated turn signal system of FIG. 2, according to one non-limiting illustrated embodiment, useful in the method of FIG. 4 in the step of sending the electrical signal causing the turn signal to turn off.

FIG. 6 shows a low level method 600 of operating the automated turn signal system 200 of FIG. 2, according to one non-limiting illustrated embodiment, useful in the method of FIG. 4 in the step of sending the electrical signal causing the turn signal to turn off.

At 602, the vehicle turn signal system 200 sends the electrical signal causing the turn signal to turn off based on a degree of the changed direction being over a threshold value.

Figure 7:
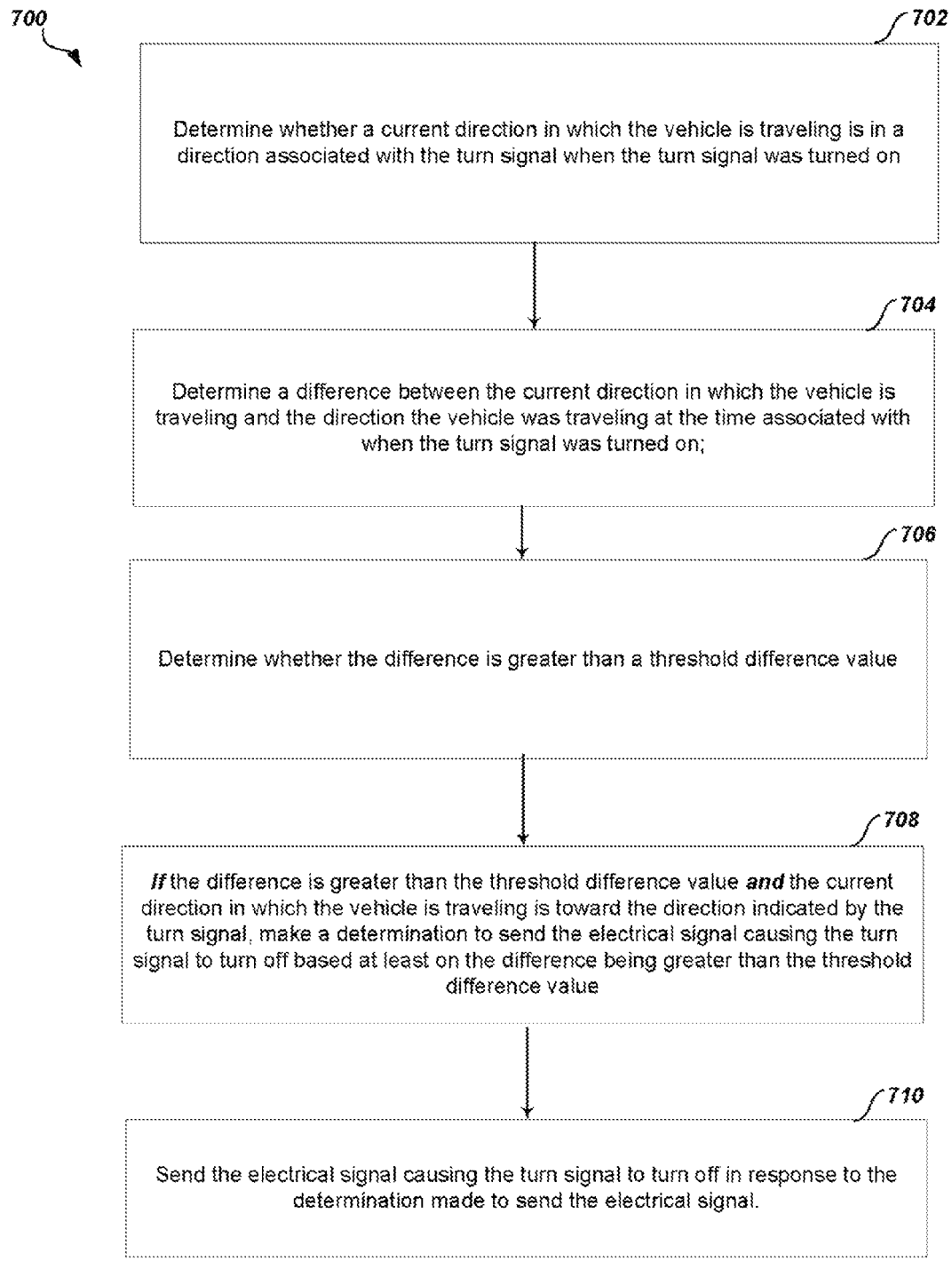
FIG. 7 is a flow diagram showing a low level method of operating the automated turn signal system of FIG. 2, according to one non-limiting illustrated embodiment, useful in the method of FIG. 6 in causing the turn signal to turn off based on a degree of the changed direction being over a threshold value.

FIG. 7 shows a low level method 700 of operating the automated turn signal system 200 of FIG. 2, according to one non-limiting illustrated embodiment, useful in the method of FIG. 6 in causing the turn signal to turn off based on a degree of the changed direction being over a threshold value.

At 702, the vehicle turn signal system 200 determines whether a current direction in which the vehicle is traveling is in a direction associated with the turn signal when the turn signal was turned on.

At 704, the vehicle turn signal system 200 determines a difference between the current direction in which the vehicle is traveling and the direction the vehicle was traveling at the time associated with when the turn signal was turned on.

At 706, the vehicle turn signal system 200 determines whether the difference is greater than a threshold difference value.

At 708, the vehicle turn signal system 200, if the difference is greater than the threshold difference value and the current direction in which the vehicle is traveling is toward the direction indicated by the turn signal, makes a determination to send the electrical signal causing the turn signal to turn off based at least on the difference being greater than the threshold difference value.

At 710, the vehicle turn signal system 200 sends the electrical signal causing the turn signal to turn off in response to the determination made to send the electrical signal.

The various methods described herein may include additional acts, omit some acts, and/or may perform the acts in a different order than set out in the various flow diagrams.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via one or more microcontrollers. However, those skilled in the art will recognize that the embodiments disclosed herein, in whole or in part, can be equivalently implemented in standard integrated circuits (e.g., Application Specific Integrated Circuits or ASICs), as one or more computer programs executed by one or more computers (e.g., as one or more programs running on one or more computer systems), as one or more programs executed by one or more controllers (e.g., microcontrollers), as one or more programs executed by one or more processors (e.g., microprocessors), as firmware, or as virtually any combination thereof, and that designing the circuitry and/or writing the code for the software and/or firmware would be well within the skill of one of ordinary skill in the art in light of the teachings of this disclosure.

When logic is implemented as software and stored in memory, logic or information can be stored on any non-transitory computer-readable medium for use by or in connection with any processor-related system or method. In the context of this disclosure, a memory is a non-transitory computer- or processor-readable storage medium that is an electronic, magnetic, optical, or other physical device or means that non-transitorily contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any physical element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), and digital tape.

The various embodiments described above can be combined to provide further embodiments. Aspects of the embodiments can be modified, if necessary, to employ systems, circuits and concepts of the various patents, applications and publications to provide yet further embodiments.

While generally discussed in the environment and context of turn signal systems for vehicles, the teachings herein can be applied in a wide variety of other environments, including other vehicular as well as non-vehicular environments.

The above description of illustrated embodiments, including what is described in the Abstract of the Disclosure, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A turn signal system for a vehicle, comprising:
   at least one controller; and
   at least one communications line coupled to the at least one controller, wherein the at least one controller is configured to:
   receive, via the at least one communications line, information indicative of a turn signal of the vehicle having been turned on and information regarding a direction associated with the turn signal;
   receive, via the at least one communications line, compass information indicative of which direction the vehicle was heading at a time associated with when the turn signal was turned on;
   receive, via the at least one communications line, compass information indicative of the vehicle having changed direction from the direction the vehicle was heading at the time associated with when the turn signal was turned on;
   make a determination of whether to send a signal to turn off the turn signal based on the received compass information indicative of the vehicle having changed direction from the direction the vehicle was heading at the time associated with when the turn signal was turned on wherein the at least one controller is configured to make the determination of whether to send the signal to turn off the turn signal by being at least configured to:
   determine whether the current direction in which the vehicle is heading is toward the direction associated with the turn signal;
   determine a difference between the current direction in which the vehicle is heading and the direction the vehicle was heading at the time associated with when the turn signal was turned on;
   determine whether the difference is greater than a threshold difference value; and
   if the difference is greater than the threshold difference value and the current direction in which the vehicle is heading is toward the direction associated with the turn signal, make a determination to send the signal to turn off the turn signal based at least on the difference being greater than the threshold difference value; and
   send the signal to turn off the turn signal if a determination was made to send the signal to turn off the turn signal.

2. The turn signal system of claim 1 wherein the received compass information indicative of the vehicle having changed direction includes information indicative of a current direction in which the vehicle is heading.

3. The turn signal system of claim 1 wherein the threshold difference value is in a range of approximately 70 degrees to approximately 90 degrees.

4. The turn signal system of claim 1 wherein the threshold difference value is approximately 80 degrees.

5. The turn signal system of claim 1 wherein the at least one controller is further configured to make the determination of whether to send a signal to turn off the turn signal by being at least configured to:
   determine whether the current direction in which the vehicle is heading is in a direction substantially opposite the direction the vehicle was heading at the time associated with when the turn signal was turned on; and
   if the current direction in which the vehicle is heading is substantially opposite the direction the vehicle was heading at the time associated with when the turn signal was turned on, make a determination to not send the signal to turn off the turn signal based at least on the current direction in which the vehicle is heading being substantially opposite the direction the vehicle was heading at the time associated with when the turn signal was turned on.

6. The turn signal system of claim 2 further comprising a compass coupled to the at least one controller and wherein the at least one controller is configured to receive from the compass the compass information indicative of which direction the vehicle was heading and the compass information indicative of the vehicle having changed direction.

7. The turn signal system of claim 2 wherein the at least one controller is part of a compass which is configured to generate the information indicative of which direction the vehicle was heading and the compass information indicative of the current direction in which the vehicle is heading.

8. The turn signal system of claim 2 further comprising a turn signal switch coupled to the a least one controller and wherein the at least one controller is configured to send to the turn signal switch the signal to turn off the turn signal.

9. The turn signal system of claim 8 wherein the at least one controller is configured to receive from the turn signal switch the information indicative of the turn signal having been turned on and the information regarding the direction associated with the turn signal.

10. The turn signal system of claim 8 wherein the turn signal switch is one of the following: a mechanical switch, an electro-mechanical switch.

11. The turn signal system of claim 8 wherein the turn signal switch is an electronic switch.

12. The turn signal system of claim 2 further comprising:
a wireless communications module coupled to the communications line, and wherein the at least one controller is configured to receive via the wireless communications module the compass information indicative of which direction the vehicle was heading and the compass information indicative of the vehicle having changed direction.

13. The turn signal system of claim 12 wherein the at least one controller is configured to receive from a satellite system via the wireless communications module the compass information indicative of which direction the vehicle was heading at the time associated with when the turn signal was turned on and the information indicative of the current direction in which the vehicle is heading.

14. The turn signal system of claim 2 wherein the at least one controller is configured to receive the information indicative of the current direction in which the vehicle is heading by at least being configured to:
in response to receiving the information indicative of the turn signal having been turned on and the information regarding the direction associated with the turn signal:
send a signal to request the information indicative of the current direction in which the vehicle is heading; and
receive the information indicative of the current direction in which the vehicle is heading in response to the signal sent to request.

15. The turn signal system of claim 2 wherein the at least one controller further comprises a memory coupled to the at least one controller, and is configured to receive the compass information indicative of which direction the vehicle was heading at the time associated with when the turn signal was turned on and receive the information indicative of the current direction in which the vehicle is heading by being at least configured to:
over a period of time that includes a substantially current time, receive compass information indicative of which direction the vehicle is heading;
store in the memory the received compass information indicative of which direction the vehicle is heading substantially as the compass information indicative of which direction the vehicle is heading is received; within the period of time, and in response to the receiving the information indicative of the turn signal having been turned on, retrieve from the stored compass information the information indicative of which direction the vehicle was heading at the time associated with when the turn signal was turned on; and
after retrieval of the information indicative of which direction the vehicle was heading at the time associated with when the turn signal was turned on, retrieve from the stored compass information, information stored at the substantially current time as the information indicative of the current direction in which the vehicle is heading.

16. The turn signal system of claim 15 wherein the at least one controller is further configured to initiate the storing in the memory of the received compass information in response to receipt of the information indicative of the turn signal having been turned on.

17. A method in an automated turn signal system for a vehicle, comprising:
receiving, by the automated turn signal system, an electrical signal indicative of a turn signal of a vehicle being on; and
sending, by the automated turn signal system, an electrical signal causing the turn signal to turn off automatically based on an orientation of the vehicle changing to turn in a direction indicated by the turn signal at a time associated with when the turn signal was turned on.

18. The method of claim 17 wherein the sending the electrical signal causing the turn signal to turn off automatically includes causing a button or lever of switch of the turn signal to return to a neutral position.

19. The method of claim 17 wherein the sending the electrical signal causing the turn signal to turn off automatically based on an orientation of the vehicle changing to turn in a direction indicated by the turn signal comprises:
receiving, by the automated turn signal system, compass information indicative of the vehicle having changed direction from a direction the vehicle was heading at a time associated with when the turn signal was turned on; and
sending, by the automated turn signal system, the electrical signal causing the turn signal to turn off based at least on the received compass information indicative of the vehicle having changed direction from the direction the vehicle was heading at the time associated with when the turn signal was turned on.

20. The method of claim 19 wherein the sending the electrical signal causing the turn signal to turn off is further based on a degree of the changed direction being over a threshold value.

21. The method of claim 19, wherein the sending the electrical signal causing the turn signal to turn off based on the received compass information comprises:
determining, by the automated turn signal system, whether a current direction in which the vehicle is heading is toward the direction indicated by the turn signal at the time associated with when the turn signal was turned on;
determining, by the automated turn signal system, a difference between the current direction in which the vehicle is heading and the direction the vehicle was heading at the time associated with when the turn signal was turned on;
determining, by the automated turn signal system, whether the difference is greater than a threshold difference value;
if the difference is greater than the threshold difference value and the current direction in which the vehicle is heading is toward the direction indicated by the turn signal, making a determination, by the automated turn signal system, to send the electrical signal causing the turn signal to turn off based at least on the difference being greater than the threshold difference value; and sending, by the automated turn signal system, the electrical signal causing the turn signal to turn off in response to the determination made to send the electrical signal.

22. A non-transitory computer-readable storage medium having computer executable instructions stored thereon that, when executed by at least one computer processor, cause the at least one computer processor to perform:

determining whether a current direction in which a vehicle is heading is toward a direction that was associated with a turn signal when it was turned on;

determining a difference between the current direction in which the vehicle is heading and a direction the vehicle was heading at a time associated with when the turn signal was turned on;

determining whether the difference is greater than a threshold difference value;

if the difference is greater than the threshold difference value and the current direction in which the vehicle is heading is in the direction associated with the turn signal, making a determination to send a signal to turn off the turn signal based at least on the difference being greater than the threshold difference value; and sending the signal to turn off the turn signal in response to the determination made to send the signal.

23. The non-transitory computer-readable storage medium of claim 22 wherein the computer executable instructions stored thereon, when executed by the at least one computer processor, further cause the at least one computer processor to perform:

over a period of time that includes a substantially current time, receiving compass information indicative of which direction the vehicle is heading;

storing the received compass information indicative of which direction the vehicle is heading, the storing occurring substantially as the compass information indicative of which direction the vehicle is heading is being received;

within the period of time, and in response to receiving information indicative of the turn signal having been turned on, retrieving from the stored compass information, information indicative of the direction the vehicle was heading at the time associated with when the turn signal was turned on; and after retrieving the information indicative of which direction the vehicle was heading at the time associated with when the turn signal was turned on, retrieving from the stored compass information, direction information stored at the substantially current time as information indicative of the current direction in which the vehicle is heading.

24. The non-transitory computer-readable storage medium of claim 22 wherein non-transitory computer-readable storage medium is a memory device located within a vehicle.

25. The non-transitory computer-readable storage medium of claim 22 wherein the computer executable instructions stored thereon, when executed by the at least one computer processor, further cause the at least one computer processor to perform:

determining whether the vehicle has been heading in a current direction the vehicle is heading over a particular length of time, then making the determination to send the signal to turn off the turn signal additionally based at least on whether the vehicle has been heading in the current direction the vehicle is heading over the particular length of time.

* * * * *